United States Patent [19]

Kudo et al.

[11] Patent Number: 4,933,692
[45] Date of Patent: Jun. 12, 1990

[54] PHOTOGRAPHIC CAMERA

[75] Inventors: Yoshinobu Kudo; Manabu Inoue; Keisuke Maeda; Yujiro Mima; Hiroshi Ootsuka, all of Osaka, Japan

[73] Assignee: Minolta Camera Kabushiki Kaisha, Osaka, Japan

[21] Appl. No.: 351,188

[22] Filed: May 12, 1989

[30] Foreign Application Priority Data

May 13, 1988 [JP] Japan ................. 63-114897
May 16, 1988 [JP] Japan ................. 63-118615

[51] Int. Cl.⁵ ............................................ G03B 3/00
[52] U.S. Cl. ................. 354/195.12; 354/412; 354/455; 354/458
[58] Field of Search ................. 354/195.12, 412, 455, 354/458

[56] References Cited

U.S. PATENT DOCUMENTS 4,806,961 2/1989 Kamitami ................. 354/195.1

FOREIGN PATENT DOCUMENTS 61-156109 7/1986 Japan .
63-95426 4/1988 Japan .
63-193117 8/1988 Japan .
63-193118 8/1988 Japan .

OTHER PUBLICATIONS

Claims and Drawings of U.S.S.N. 253,387, filed Oct. 3, 1988.

Primary Examiner—Michael L. Gellner
Attorney, Agent, or Firm—Willian, Brinks, Olds, Hofer, Gilson & Lione

[57] ABSTRACT

A photographic camera which assures proper use of a front converter and prevents out-of-focus photographing when the front converter is used and wherein a switch for detecting whether a tele-converter is in its operative position or inoperative position is not exposed outside the camera. The switch is provided in a converter body removably mounted on a camera body and is connected in series to another switch also provided in the camera body for operation upon attachment of the converter body to the camera. When the converter is mounted in its operative position on the camera body, it is detected by a control circuit in the camera body in accordance with a signal received from the switches, and the control circuit controls various functions of the camera in a different manner from that when the converter is not in its operative position.

30 Claims, 19 Drawing Sheets

PHOTOGRAPHIC CAMERA

BACKGROUND OF THE INVENTION

1. Field of the Invention

This invention relates to a photographic camera, and more particularly to a photographic camera to which a converter lens can be attached.

2. Description of the Prior Art

An automatic camera which has a built-in flash device and an automatic exposure controlling device operates automatically to cause the flash device to emit light when the brightness of an object to be photographed becomes low until the exposure of the camera exceeds, for example, a preset exposure value EV.

When a front tele-converter lens, including a conversion lens system, is attached to such camera, an entire focal length of a whole lens system comprising a main lens system provided in the camera and the conversion lens system is extended in comparison with the focal length of the main lens system alone. However, an opening diameter of the aperture diaphragm provided in the main lens system is not changed, and therefore, F-number of the whole lens system is not changed in comparison with the F-number of the main lens system alone, even if the front tele-converter lens is attached to such camera. Therefore, the possibility of taking a plurality of out-of-focus photographs will be increased if the front tele-converter is attached, since the depth of field of the whole lens system is narrower than that of the main lens system alone.

A lens shutter is known as an exemplary means for resolving the problem just described. The lens shutter is constructed to gradually open a plurality of shutter blades with decreasing its opening speed by a governor, and to start closing the plurality of shutter blades during its opening operation when the brightness of the object is sufficiently high. The plurality of shutter blades also serve as an aperture diaphragm in the above-described lens shutter. Therefore, the lens shutter enables photographing in a restricted aperture condition in which the depth of field is relatively wide to prevent taking of a plurality of out-of-focus photographs.

Such a camera as described above can be constructed such that, when the brightness of an object to be photographed is excessively low, a flash device of the camera is automatically activated to emit flash light. However, also a camera is already known which includes a switching means for switchably controlling a flash device so that, if a photographer desires so, the flash device may not emit light, that is, emission of light may be inhibited in order to attain a distinct photographing effect. Even with the camera just mentioned, where no converter lens is used, the shutter speed is not lowered considerably, and accordingly, out-of-focus photographing takes place little.

However, in order to photograph using a converter lens but without using a flash device when an object to be photographed is too dark, the shutter speed must necessarily be decreased. Even with the lens shutter, however, there is a drawback that, as the shutter speed decreases, the period of time within which the aperture diaphragm is open increases and a small aperture restricting effect by the lens shutter is lost, resulting in increase in probability of out-of-focus photographing.

Meanwhile, an exemplary tele-converter is secured at a bottom portion thereof to a bottom portion of a camera and includes an auxiliary lens system which is mounted for moving between an operative position and an inoperative position with respect to a main lens system of the camera by means of a hinge provided in the tele-converter lens.

Further, a camera is already known which includes a switch located at a top portion thereof such that it may be pushed by a projection provided at an upper portion of a tele-converter to detect that the tele-converter is not in its inoperative position but is in its operative position.

Where the detecting switch is exposed outside the camera as in a conventional camera, there are drawbacks that dust or the like is accumulated on or around the switch and may cause incomplete contact of the switch and that the switch may be depressed inadvertently or in error.

SUMMARY OF THE INVENTION

It is an object of the present invention to provide a photographic camera which assures proper use of a front converter and prevents out-of-focus photographing when the front converter is used.

It is another object of the present invention to provide a photographic camera wherein a switch for detecting whether a tele-converter is in its operative position or inoperative position is not exposed outside the camera.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
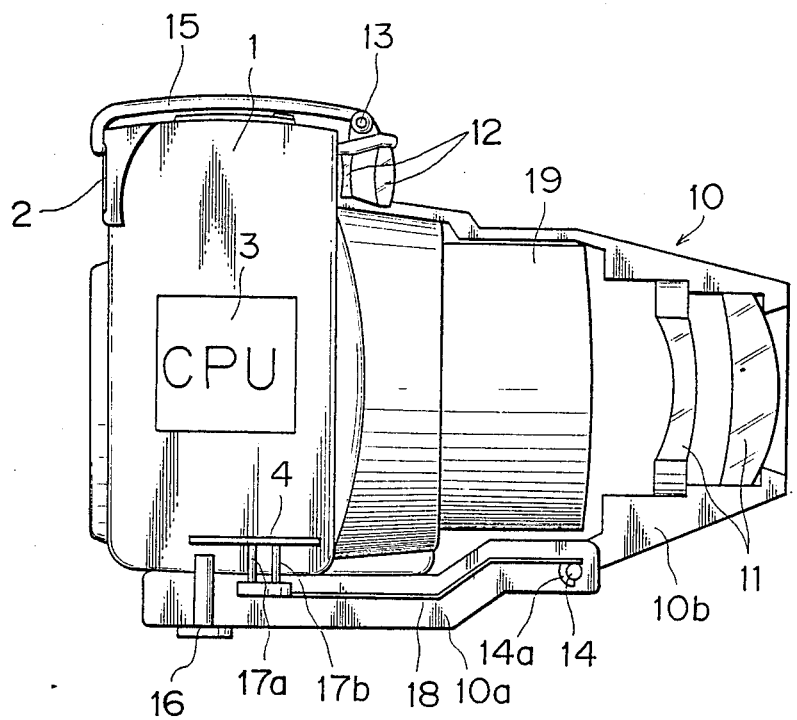
FIG. 1 is a schematic side elevational view of a photographic camera to which the present invention is applied.
Figure 2:
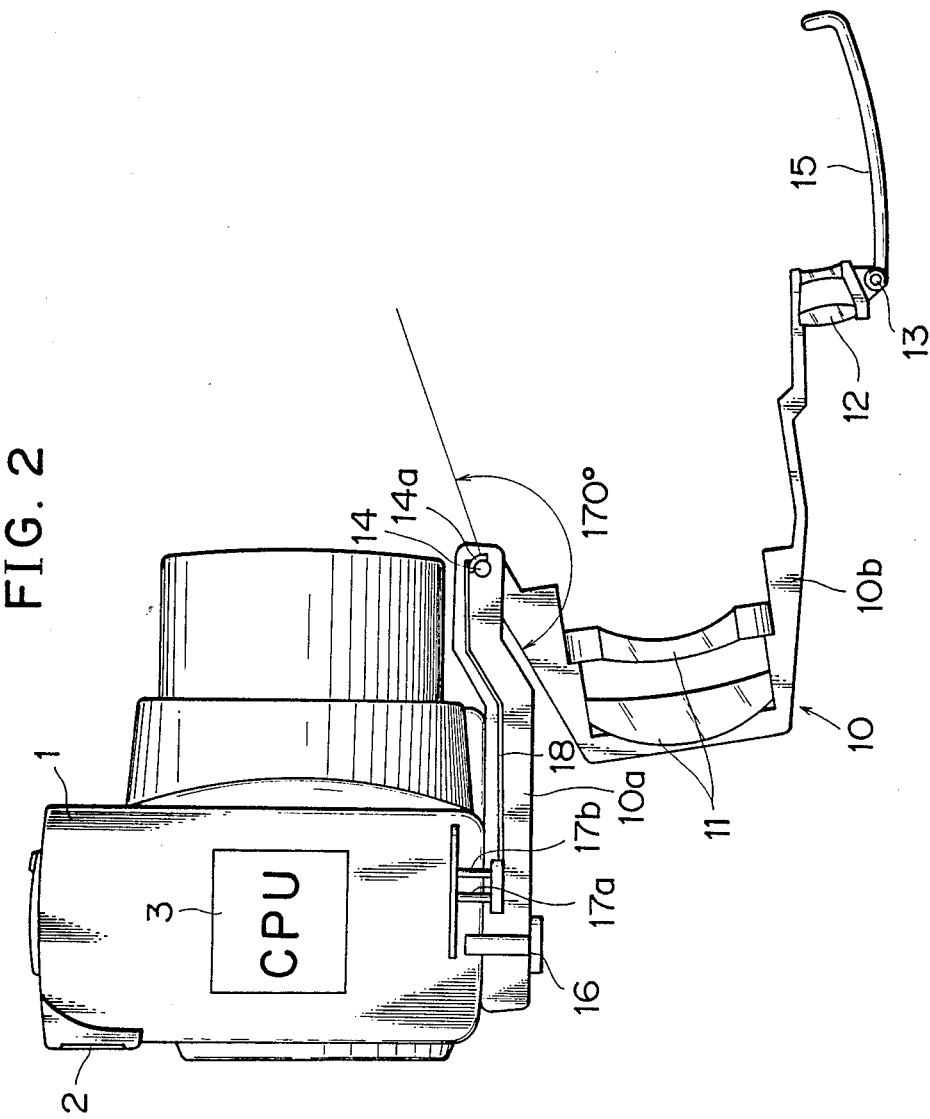
FIG. 2 is a schematic side elevational view of the photographic camera shown in FIG. 1 when a tele-converter is at its inoperative position.

Referring first to FIGS. 1 and 2, there is shown a photographic camera to which the present invention is applied. The camera shown includes a camera body 1. The camera body 1 includes a photographic lens system 19 which can be changed over between a wide condition (W) and a tele condition (T). The camera further includes a tele-converter including a converter body 10 mounted for shifting movement between an operative position shown in FIG. 1 in which it can be used and another inoperative position shown in FIG. 2 in which it cannot be used. A viewfinder eyepiece section 2 is provided on the camera body 1, and a CPU (central processing unit) or microcomputer 3 for controlling various functions of the camera and a flexible circuit board 4 for transmitting information from the tele-converter to the CPU 3. The photographic lens system 19 is mounted for advancing and retracting movement in the camera body 1 for changing over the focal length thereof.

Meanwhile, an auxiliary lens system 11 and a viewfinder optical system 12 are mounted on the converter body 10. The converter body 10 is removably mounted at a bottom portion of the camera body 1 by means of a fastening screw 16 screwed into threaded holes (not shown) formed in a bottom wall of the camera body 1. In order to assure mounting of the tele-converter on the camera body 1 and allow the tele-converter to be brought to its inoperative position readily, the converter body 10 includes a fixed portion 10a at which the converter body 10 is removably mounted on the camera body 1, a pivotal portion 10b supported at an end thereof for pivotal motion on the fixed portion 10a by means of a hinge 14, and an arm 15 supported for pivotal motion at the other end of the pivotal portion 10b for engaging with the eyepiece section 2 on the camera body 1. A pair of communicating pins 17a and 17b are provided on the fixed portion 10a of the converter body 10 for contacting with the flexible circuit board 4 to transmit converter mounting information to the CPU 3.

Figure 3:
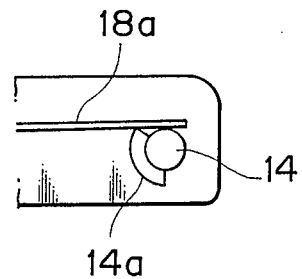
FIG. 3 is an enlarged view of a hinge of the photographic camera shown in FIG. 1.
Figure 4:
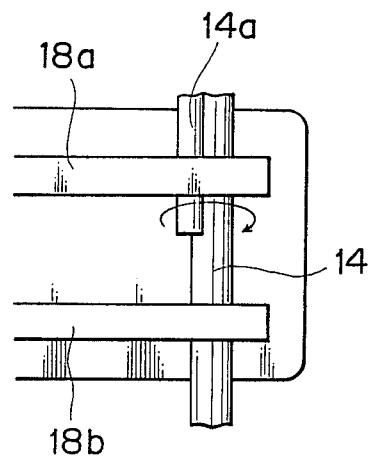
FIG. 4 is a view of the hinge shown in FIG. 3 but as viewed in a perpendicular direction.

Referring now to FIGS. 3 and 4, the hinge 14 is shown more in detail. The hinge 14 is secured to the pivotal portion 10b and supported for rotation around its axis on the fixed portion 10a of the converter body 10. The hinge 14 is made of a conducting material, and an insulating member 14a is securely mounted at part of an outer periphery of a portion of the hinge 14. A pair of contacts 18a and 18b are disposed on the fixed portion 10a of the converter body 10 such that the contact 18b is always held in contact with the hinge 14 while the other contact 18a contacts with the hinge 14 when the tele-converter is in its operative position as shown in FIG. 1, but when the tele-converter is in its inoperative position as shown in FIG. 2, the contact 18a contacts with the insulating member 14a. Though not particularly shown, the contacts 18a and 18b are electrically connected to the communicating pins 17a and 17b, respectively. Accordingly, the communicating pins 17a and 17b are short-circuited by the contacts 18a and 18b and the hinge 14 when the tele-converter is in its operative position, but they are disconnected by the insulating member 14a on the hinge 14 when the tele-converter is in its inoperative position. The insulating member 14a thus forms a switch STC for electrically interconnecting and disconnecting the communicating pins 17a and 17b. The CPU 3 thus discriminates, when it detects that the communicating pins 17a and 17b are short-circuited, that the tele-converter is in its operative position.

Where the converter body 10 is mounted on the camera body 1, the tele-converter can be shifted from its inoperative position to its operative position in the following manner.

In particular, the tele-converter is mounted in its inoperative position on the camera in FIG. 2. When the tele-converter is in the position shown in FIG. 2, the pivotal portion 10b of the converter body 10 assumes a position angularly spaced, for example, by 180 degrees (indicated as 170 degrees in FIG. 2) in the clockwise direction around the axis of the hinge 14 from its position shown in FIG. 1, and in the position of the pivotal portion 10b of the converter body 10, the photographing lens system 11, viewfinder optical system 12, hinge arm 13 and arm 15 are retracted from a path of photographing light to the camera body 1. Meanwhile, when the fixed portion 10a of the converter body 10 is secured to the bottom of the camera body 1, the communicating pins 17a and 17b are inserted into the inside of the camera body 1 through holes (not shown) formed in the bottom wall of the camera body 1 and are brought into contact with the flexible circuit board 4. The communicating pins 17a and 17b are resiliently supported for up and down movement by means of a spring (not shown) provided in the fixed portion 10a of the converter body 1. Accordingly, after the communicating pins 17a and 17b are contacted with the flexible circuit board 4, they are held in contact under a suitable resilient force with the flexible circuit board 4 to assure contact between them.

When the tele-converter is to be shifted from its inoperative position shown in FIG. 2 to its operative position shown in FIG. 1, the pivotal portion 10b of the converter body 10 is pivoted, for example, by 180 degrees in the counterclockwise direction around the axis of the hinge 14 together with the auxiliary lens system 11, viewfinder optical system 12, hinge 13 and arm 15 thereon so that it may cover the camera body 1, and then the arm 15 is pivoted in the counterclockwise direction about the hinge 13 until it is engaged with and arrested by the eyepiece section 2 on the camera body 1, thereby attaining the condition shown in FIG. 1.

Figure 5A:
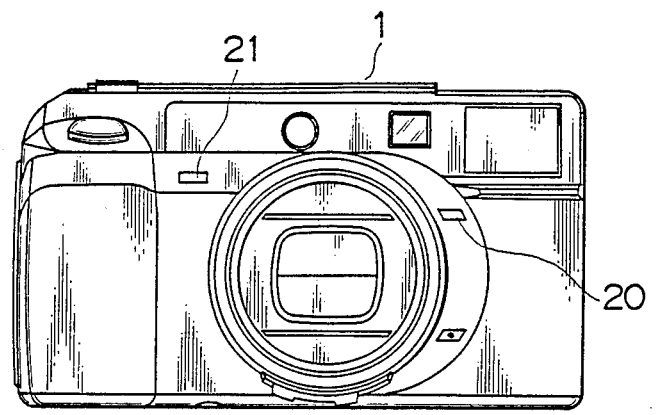
FIG. 5a is a front elevational view of the camera of FIG. 1 when the tele-converter is not attached and FIG. 5b is a similar view when the tele-converter is attached.
Figure 5B:
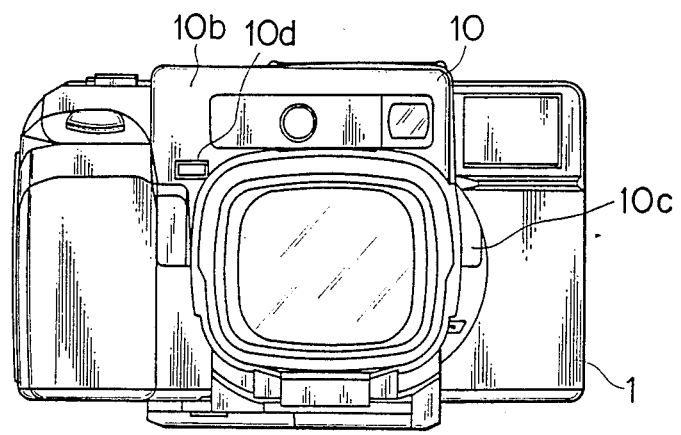
Figure 6A:
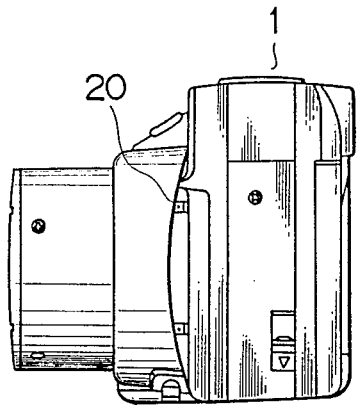
FIGS. 6a and 6b are side elevational views of the camera of FIG. 1 when the tele-converter is not attached and is attached, respectively.
Figure 6B:
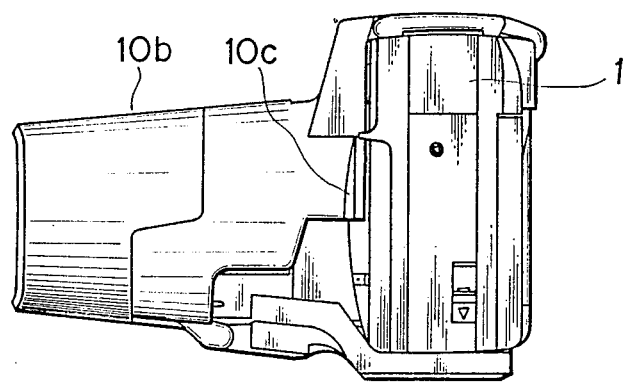

FIGS. 5b and 6b show the camera body 1 on which the tele-converter described above is mounted while FIGS. 5a and 6a show the camera body 1 from which the tele-converter is removed. As shown in FIGS. 5a and 6a, the camera body 1 has a push-button switch 20 serving as a manually operable switching means for selecting use of a flash device controlling means not shown. When the push-button switch 20 is depressed by a finger of a photographer or the like, then emission of light from a flash device of the camera is inhibited even if the brightness of an object to be photographed is excessively low while the mode of operation of the camera is automatically changed over to a long time exposure mode in accordance with a control program stored in the CPU 3 in the camera body 1. After the finger is released, the push-buttom switch 20 restores its initial position whereupon the flash device is changed over, in response to an instruction from the CPU 3, to a condition in which emission of flash light therefrom is automatically controlled in accordance with a brightness of an object to be photographed.

The pivotal portion 10b of the converter body 10 has a cover portion 10c which is located such that, when the tele-converter is mounted on the camera body 1 and is in its operative position, it covers the push-button switch 20 to disable operation of the push-button switch 20 as can be seen from comparison between FIGS. 5a and 6a and FIGS. 5b and 6b. Accordingly, where the tele-converter is in its operative position on the camera body 1, emission of flash light from the flash device cannot be inhibited.

When the tele-converter is in use, if the brightness of an object to be photographed is sufficiently high, photographing is performed without using the flash device, but if the brightness is not sufficiently high, the mode of the camera is automatically changed over to a photographing mode in which emission of flash light is involved. Thus, in either case, photographing can be achieved without fail with a small aperture restricting effect which is a characteristic of the lens shutter.

The camera body 1 further has a self timer indicator 21 which is continuously lit or blinks to inform a photographer of an operating condition of a self timer not shown. The self timer indicator 21 can be observed from outside of the camera body 1, even if the tele-converter is in its operative position on the camera body 1, through a window 10d perforated in the pivotal portion 10b of the converter body 10.

Figure 7:
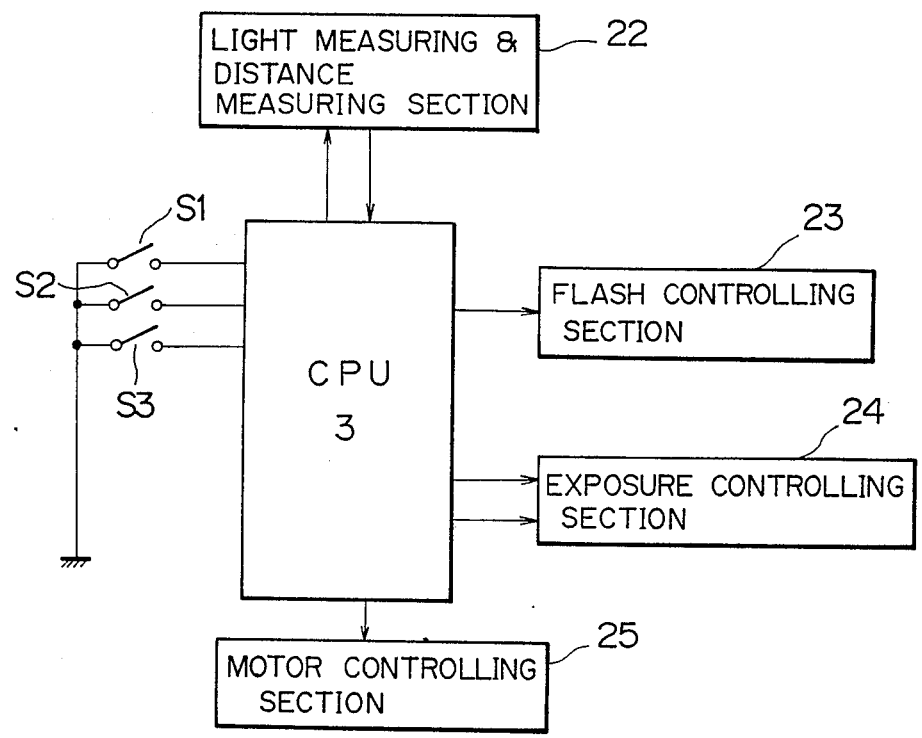
FIG. 7 is a block diagram of an electric circuit of the photographic camera of FIG. 1.

Referring now to FIG. 7, there is shown an exemplary electric circuit of the photographic camera described above. The circuit shown includes a light measuring switch S1 for measuring a brightness of an object to be photographed, and a shutter release switch S2. The switches S1 and S2 are operated successively upon operation of a release button (not shown). The circuit further includes a light emission inhibiting switch S3 which corresponds to the switch 20 described hereinabove. The switches S1, S2 and S3 are connected to the CPU 3 such that, when any of the switch S1, S2 and S3 is turned on, a corresponding input port of the CPU3 to which it is connected is short-circuited to the ground.

The CPU 3 is connected to various circuits including a light measuring and distance measuring section 22 which performs measurements of light from and a distance to an object to be photographed in response to a signal from the CPU 3 and sends resulted data of such measurements back to the CPU 3.

A flash controlling section 23 controls emission of light from the flash device in response to a signal received from the CPU 3.

An exposure controlling section 24 starts an advancing movement of the lens system to an in-focus position and an opening of the shutter in response to a signal from the CPU 3 and closes the shutter in response to another signal from the CPU 3.

A motor controlling section 25 controls a motor (not shown) to generate power to wind up a film (not shown) and charging of the shutter mechanism and so on.

Figure 8:
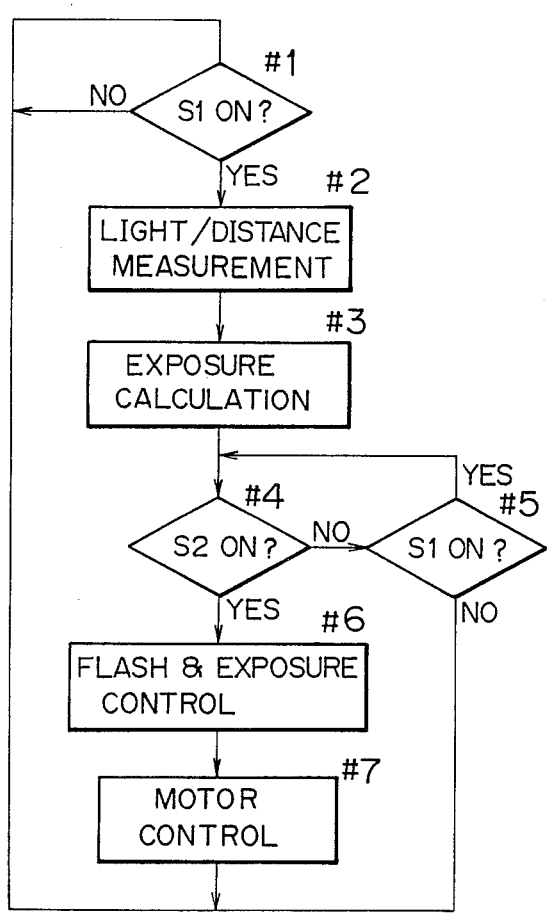
FIGS. 8 and 9 are flow charts illustrating operation of the photographic camera of FIG. 1.

FIG. 8 illustrates general operation of the CPU 3 of the camera described hereinabove. In the flow chart shown in FIG. 8, any step number is preceded by a mark #. This also applies to all flow charts shown in the drawings.

Referring to FIG. 8, when the shutter release button (not shown) of the camera is operated to perform photographing, the light measuring or photographing preparing switch S1 is turned on, and this is detected at step #1 by the CPU 3. Then, the sequence advances to step #2 at which the CPU 3 controls the light measuring and distance measuring section 22 to perform light measurement and distance measurement and receives data of such measurements from the light measuring and distance measuring section 22. Then at step #3, the CPU 3 calculates and determines in accordance with data thus received in what manner the shutter, the flash device and some other functions of the camera should be controlled.

After then, at steps #4 and #5, the CPU 3 waits, while the switch S1 remains in its on-state, until the release switch S2 is turned on. In case the switch S1 is turned off before the release switch S2 is turned on, the sequence returns to step #1 in order to prepare for a next photographing operation.

To the contrary, in case the release switch S2 is turned on at step #4, the sequence advances to step #6 at which the flash device and the shutter are controlled in accordance with the data obtained at step #3. After completion of an exposure operation, the motor (not shown) is driven at step #7 to perform charging of a film (not shown) and so on. After then, the sequence returns to step #1 to prepare for a next photographing operation.

Figure 9:
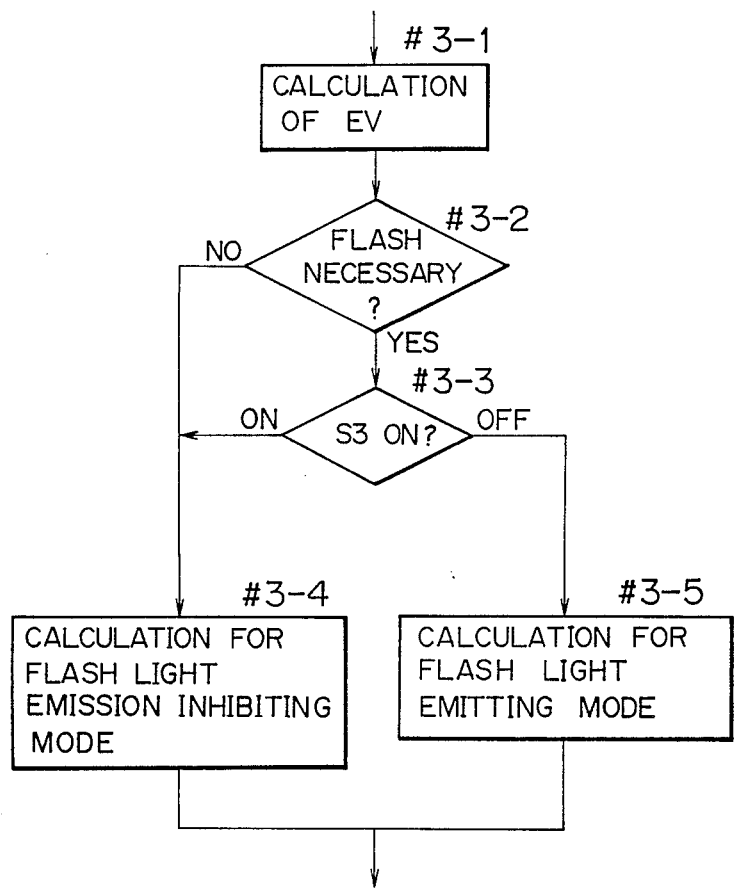

Contents of the control at step #3 are illustrated more in detain in FIG. 9. Referring to FIG. 9, the CPU 3 calculates, at step #3-1, an exposure value EV in accordance with data of light measurement obtained at step #2 and a film sensitivity inputted in advance to the CPU 3 at a control step not specifically shown. Then at step #3-2, the value EV calculated at step #3-1 is checked to determine whether or not emission of light from the flash device is necessitated. In case no emission of flash light is required, the sequence advances to step #3-4 at which a calculation for a flash light emission inhibiting mode is executed in order to find out a value of a shutter speed with which an appropriate exposure value is assured.

To the contrary, in case it is judged at step #3-2 that emission of flash light is required, the sequence advances to step #3-3 at which it is judged whether or not the light emission inhibiting switch S3 is in an on-state. If the switch S3 is in an on-state, then the sequence advances to step #3-4 described above. To the contrary, in case the switch S3 is in an off-state, the sequence advances to step #3-5 at which a calculation for a flash light emitting mode is executed to find out a value of a shutter speed which takes flash light emitted from the flash device and having an intensity obtained from a calculation into consideration when the shutter is operated.

Accordingly, when the switch S3 is turned on to establish a flash light emission inhibiting mode while no tele-converter is mounted on the camera, photographing is performed without flash light from the flash device. To the contrary, where the tele-converter is mounted in its operative position on the camera, the switch S3 always assumes an off-state, and consequently, flash photographing is normally performed with the camera. Thus, where the tele-converter is mounted in its operative position on the camera, an exposure operation is performed always at a comparatively high shutter speed making the most of the characteristic of a lens shutter. Accordingly, it can be prevented to keep the shutter at a large aperture position for a long period of time, and the depth of field can be increased by a restricting effect by the lens shutter. Consequently, deterioration of the drawing performance of the camera by an out-of-focus condition or the like can be prevented.

Figure 10:
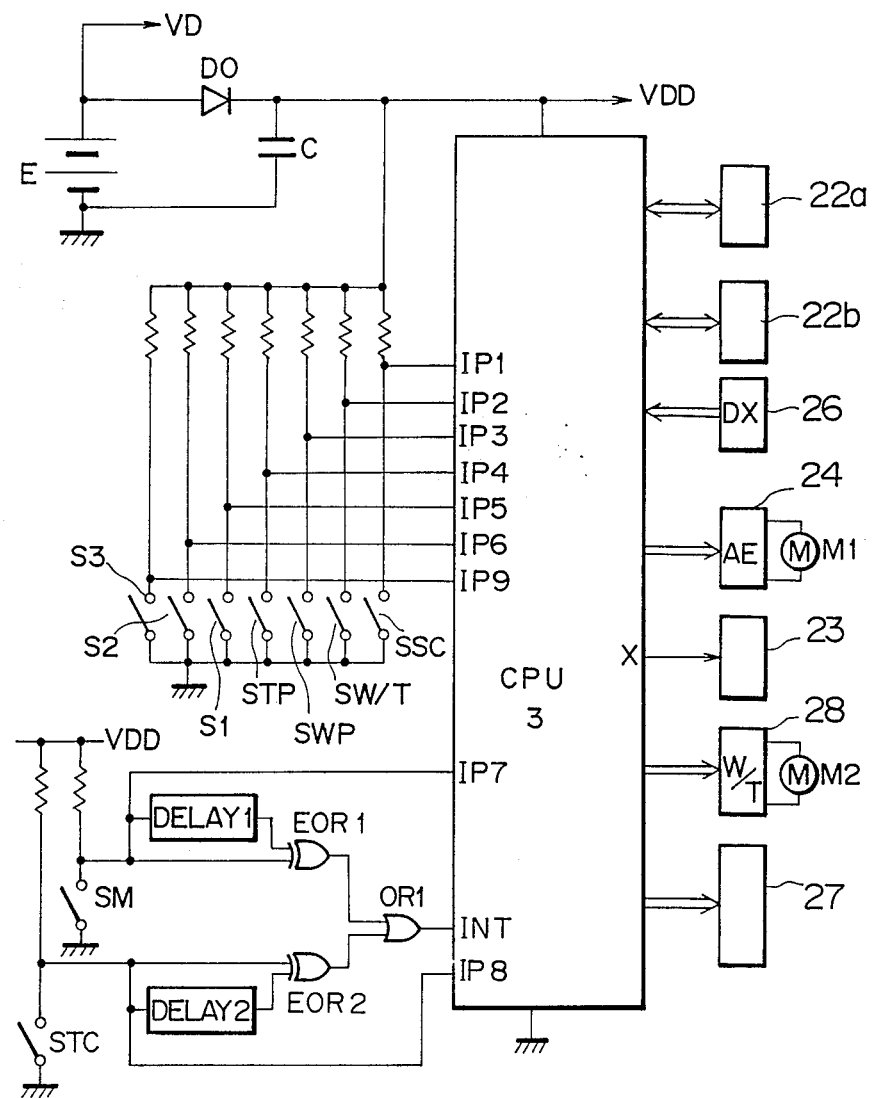
FIG. 10 is a circuit diagram showing more detailed construction of the electric circuit shown in FIG. 7.

Referring now to FIG. 10, the circuit shown in FIG. 7 is shown more in detail. The circuit shown includes a power source E which produces a power source voltage VD for driving the components of the circuit other than the CPU 3, and another power source voltage VDD for the CPU 3 which is supplied to the CPU 3 by way of a backup capacitor C and a rectifying diode DO.

The light measuring and distance measuring section 22 shown in FIG. 7 is shown as two separate circuits including a light measuring circuit 22a and a distance measuring circuit 22b in FIG. 10. Thus, information of a brightness of an object to be photographed is delivered from the light measuring circuit 22a to the CPU 3 while information of a distance to the object is delivered from the distance measuring circuit 22b to the CPU 3. A DX circuit or automatic film sensitivity reading circuit 26 for reading a DX code on a film magazine loaded in position in the camera is also connected to the CPU 3 and delivers information of a film sensitivity of the loaded film to the CPU 3. It is to be noted that the CPU 3 has stored a guide number of the flash device therein.

A focusing circuit 27 receives distance information from the distance measuring circuit 22a via the CPU 3 and moves the photographing lens system 19 of the camera body 1 in accordance with such distance information. Focusing in this instance is of the zone focusing type wherein a distance from the camera is divided into several distance ranges or zones. The exposure controlling section or circuit 24 produces pulses in response to a signal from the CPU 3 to drive a stepping motor M1 to open or close the lens shutter which serves also as an aperture diaphragm.

A W/T changing over circuit 28 drives, in response to a signal from the CPU 3, another motor M2 to change over the position of the photographing lens system 19 between a wide condition (W) and a tele condition (T) for changing the focal length thereof.

The CPU 3 has an output port X from which it delivers a light emitting instruction signal to the flash controlling circuit 23.

The CPU 3 has several input ports IP1 to IP9. The input port IP1 is connected to a shutter close detecting switch SSC which presents an off-state (IP1="H" (high level)) when the shutter is open but presents an on-state (IP="L" (low level)) when the shutter is closed.

The input port IP2 is connected to a focal length changing over switch SW/T which is a normally open, manually operable switch provided on the camera body 1 and changes the voltage at the input port IP2 of the CPU 3 to the low level each time it is operated.

The input port IP3 is connected to a wide position detecting switch SWP which presents an on-state to provide the low level voltage to the input port IP3 when the photographing lens system 19 of the camera body 1 is positioned for a wide condition (W).

The input port IP4 is connected to a tele position detecting switch STP which presents an on-state to provide the low level voltage to the input port IP4 when the photographing lens system 19 is positioned at the advanced position to the tele (T) condition.

The input port IP5 is connected to the aforementioned light measuring switch or photographing preparing switch S1 which changes the voltage at the input port IP5 to the low level when it is turned on.

The input port IP6 is connected to the release switch or photographing switch S2 which changes the voltage at the input port IP6 to the low level when the release button is depressed deeply farther than the position of the switch S1 so that the switch S2 is turned on.

The input port IP9 is connected to the light emission inhibiting switch S3 which is put into a low level voltage state by manual operation thereof as described hereinabove.

The input port IP7 is connected to a main switch SM in the form of a manually operable switch which is provided on the camera body 1 and operates in response to opening or closing movement of a lens barrier of the camera body 1. When the switch SM is in an on-state, the voltage at the input port IP7 is held at the low level which enables an exposure operation of the camera, but when the switch SM is in an off-state, the voltage is held at the high level which disables or inhibits an exposure operation of the camera.

The input port IP8 is connected to the flexible circuit board 4 described hereinabove and shown in FIG. 1, and when the tele-converter is in its operative position shown in FIG. 1, the voltage at the input port IP8 is held at the low level by way of the aforementioned switch STC which is formed from the hinge 14, insulating member 14a and communicating pins 17a and 17b.

The CPU 3 has an interrupt input port INT connected to the switches SM and STC. A signal produced from the switch SM is transmitted on one hand directly to an exclusive OR circuit EOR1 and on the other hand by way of a delay circuit Delay1 to the exclusive OR circuit EOR1. Meanwhile, a signal produced from the switch STC is transmitted on one hand directly to another exclusive OR circuit EOR2 and on the other hand by way of another delay circuit Delay2 to the exclusive OR circuit EOR2. Outputs of the exclusive OR circuits EOR1 and EOR2 are transmitted to an OR circuit OR1 the output of which is coupled to the interrupt input port INT of the CPU 3. Accordingly, if one of the switches SM and STC is opened or closed, then the interrupt input terminal INT of the CPU 3 is immediately changed over from the low level to the high level and then held in the high level state for a predetermined period of time.

Operation of the CPU 3 of the camera described above will be described below with reference to a flow chart shown in FIG. 11.

Figure 11:
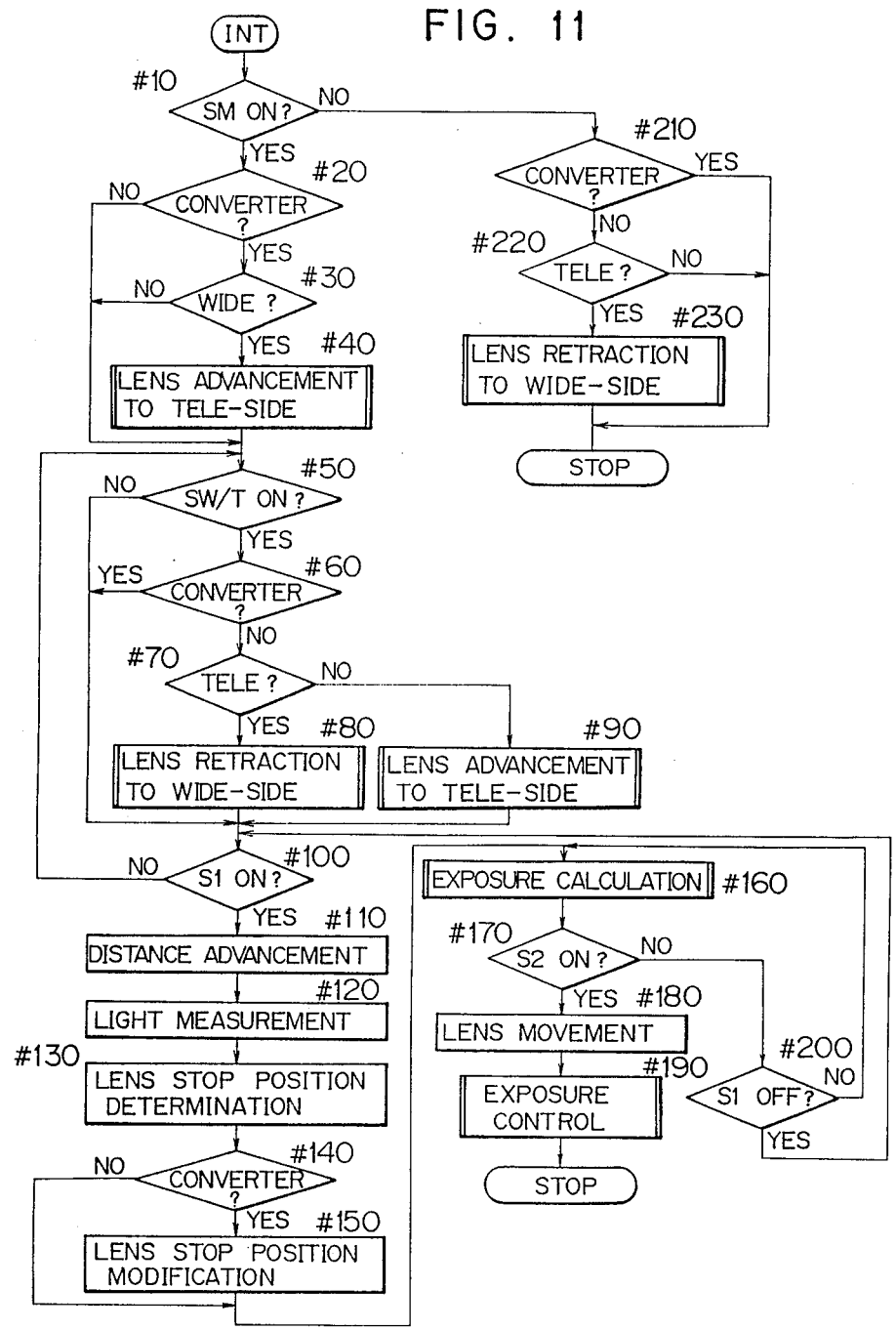
FIGS. 11 to 14 and 16 are flow charts illustrating more detailed operation of the camera shown in FIG. 1.

The sequence of control shown in FIG. 11 is entered when one of the switches SM and STC is opened or closed to change the voltage at the interrupt input port INT of the CPU 3 from the low level to the high level.

Thus, at first at step #10, the CPU 3 judges whether or not the main switch SM is in an on-state, that is, whether or not the voltage level at the input port IP7 thereof is low. In case the main switch SM is in an off-state (IP7="H"), the sequence advances to step #210 at which it is judged whether or not the tele-converter is mounted on the camera body 1. Then, if the tele-converter is mounted (IP8="L"), then the CPU 3 enters a rest state without executing anything further. Accordingly, even if the main switch SM is not in an on-state, if the tele-converter is in its operative position, the photographing lens system 19 can be maintained in the tele condition. Further, the power consumption by the CPU 3 can be avoided until a photographer turns the main switch SM on in order to perform an exposure operation.

In case it is judged at step #210 that the tele-converter is not mounted on the camera body 1, the sequence advances to step #220 at which it is judged whether or not the photographing lens system 19 is in its tele condition. Then, in case the photographing lens system 19 is not in its tele condition (IP4="H"), the CPU 3 enters a rest state similarly. To the contrary, in case the photographing lens system 19 is in a tele condition (IP4="L"), the sequence advances to step #230 at which the photographing lens system 19 is retracted to and stopped at its wide condition. The retracting control at step #230 is illustrated more in detail in FIG. 12.

Figure 12:
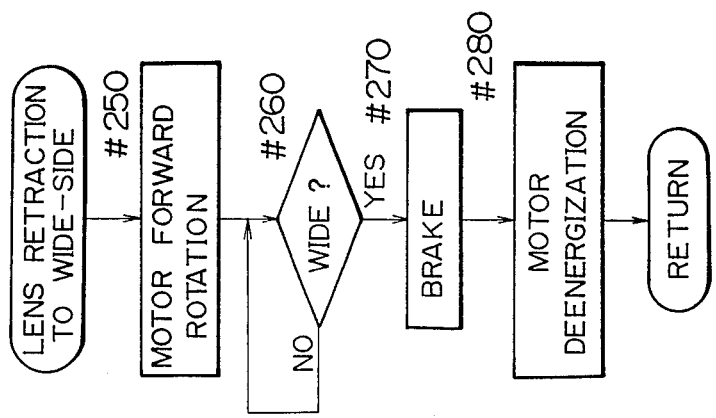

Referring to FIG. 12, at first at step #250, the motor M2 is driven to rotate forwardly to start a retracting operation of the photographing lens system 19. Then at step #260, the CPU 3 waits until the wide condition of the photographing lens system 19 is reached so that the switch SWP is turned on (IP3="L"). Subsequently at step #270, the motor M2 is braked for a predetermined period of time, and then at step #280, the motor M2 is deenergized to stop. After then, the sequence returns to the original step from which the sequence advanced to step #250 of FIG. 12.

Referring back to FIG. 11, in case it is judged at step #10 that the main switch SM is in an on-state (IP7="L"), the sequence advances to step #20 at which it is judged whether or not the tele-converter is in its operative position. Then if the tele-converter is not in its operative position (IP8="H"), the sequence advances directly to step #50.

To the contrary, if the tele-converter is in its operative position at step #20, the CPU 3 judges at subsequent step #30 whether of not the photographing lens system 19 is in its wide condition. Then, if the photographing lens system 19 is not in its wide condition (IP3="H"), the sequence advances directly to step #50 similarly.

To the contrary, if the photographing lens system 19 is in its wide condition (IP3="L") at step #30, the sequence advances to step #40 at which the photographing lens system 19 is advanced to its tele condition.

Since the photographing lens system 19 is used only in its tele condition when the tele-converter is in its operative position, it is advanced to the tele condition at step #40, and such advancement is performed directly after the tele-converter is shifted to its operative position independently of a position of the main switch SM. Thus, if a user of the camera intends to perform photographing immediately, an exposure operation is performed immediately without waiting for a long interval of time for advancement of the photographing lens system.

Figure 13:
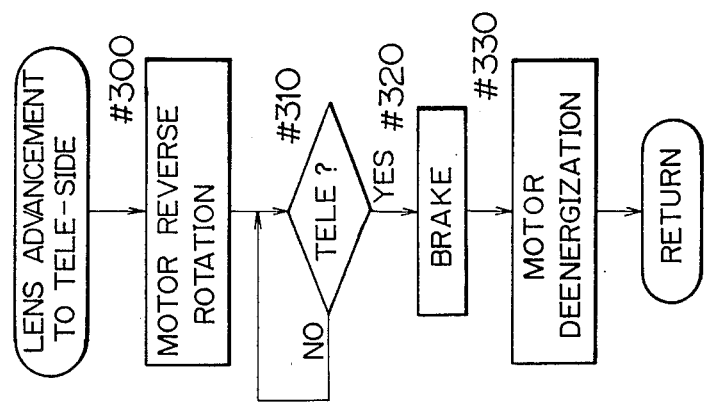

Such control at step #40 is illustrated more in detail in FIG. 13. Referring to FIG. 13, the motor M2 is driven to rotate reversely to advance the photographing lens system 19 at first at step #300. Then, the CPU 3 waits at step #310 until the switch STP is turned on (IP4="L") to indicate that the photographing lens system 19 is in its tele condition. Then at step #320, the motor M2 is braked for a predetermined period of time, and then at step #330, the motor M2 is deenergized, whereafter the sequence returns to the original step.

Referring back again to FIG. 11, the CPU 3 judges at step #50 whether or not the focal length changing over switch SW/T is operated. In case the switch SW/T is not operated (IP2="H"), the sequence advances directly to step #100.

To the contrary, if the switch SW/T is operated at step #50, then the CPU 3 judges at subsequent step #60 whether or not the tele-converter is in its operative position (IP8="L"). In case the tele-converter is not in its operative position (IP8="H"), the sequence advances to step #70 at which it is judged whether or not the photographing lens system 19 is in its tele condition, and in case the photographing lens system 19 is in its tele condition (IP4="L"), the sequence advances to step #80 at which the same control as executed at step #230, that is, the control at steps #250 to #280 shown in FIG. 12, is executed to retract the photographing lens system 19 to its wide condition, whereafter the sequence advances to step #100. To the contrary, in case it is judged at step #70 that the photographing lens system 19 is not in its tele condition (IP4="H"), the sequence advances to step #90 at which the same control as executed at step #40, that is, the control at steps #300 to #330 shown in FIG. 13, is executed to advance the photographing lens system 19 to its tele condition, whereafter the sequence advances to step #100.

To the contrary, in case it is judged at step #60 that the tele-converter is in its operative position (IP8="L"), the steps 70 to 90 are bypassed to prevent changing over of the position of the photographing lens system 19 between the wide and the tele condition at such steps 80 and 90 because photographing using the tele-converter must be performed when the photographing lens system 19 of the camera body 1 is positioned on the tele-photographing side.

At step #100, it is judged whether or not the photographing preparing switch S1 is in an on-state (IP5="L"). In case the switch S1 is not in an on-state (IP5="H"), the sequence returns to step #50 to repeat the control of steps #50 to #100. To the contrary, if the switch S1 is in an on-state (IP5="L") at step #100, the sequence advances to step #110.

At step #110, the CPU 3 controls the distance measuring circuit 22b to perform measurement of a distance to an object to be photographed and receives distance information from the distance measuring circuit 22b.

Then at step #120, the CPU 3 controls the light measuring circuit 22a to perform measurement of light from the object and receives measured brightness data BV as an APEX value from the light measuring circuit 22a.

Subsequently at step #130, a position to which the photographing lens system 19 should be moved on the assumption that the tele-converter is not in its operative position is determined in accordance with the distance information obtained at step #110. In other words, one of zones of the photographing lens system 19 is selected.

Then at step #140, it is judged whether or not the tele-converter is in its operative position. If the tele-converter is not in its operative position (IP6="H"), then the sequence advances directly to step #160. To the contrary, if the tele-converter is in its operative position (IP6="L"), the sequence advances to step #150 at which modification or correction is made to the stopping position of the photographing lens system 19 for focusing which varies where the tele-converter is used. After then, the sequence advances to step #160.

Figure 14:
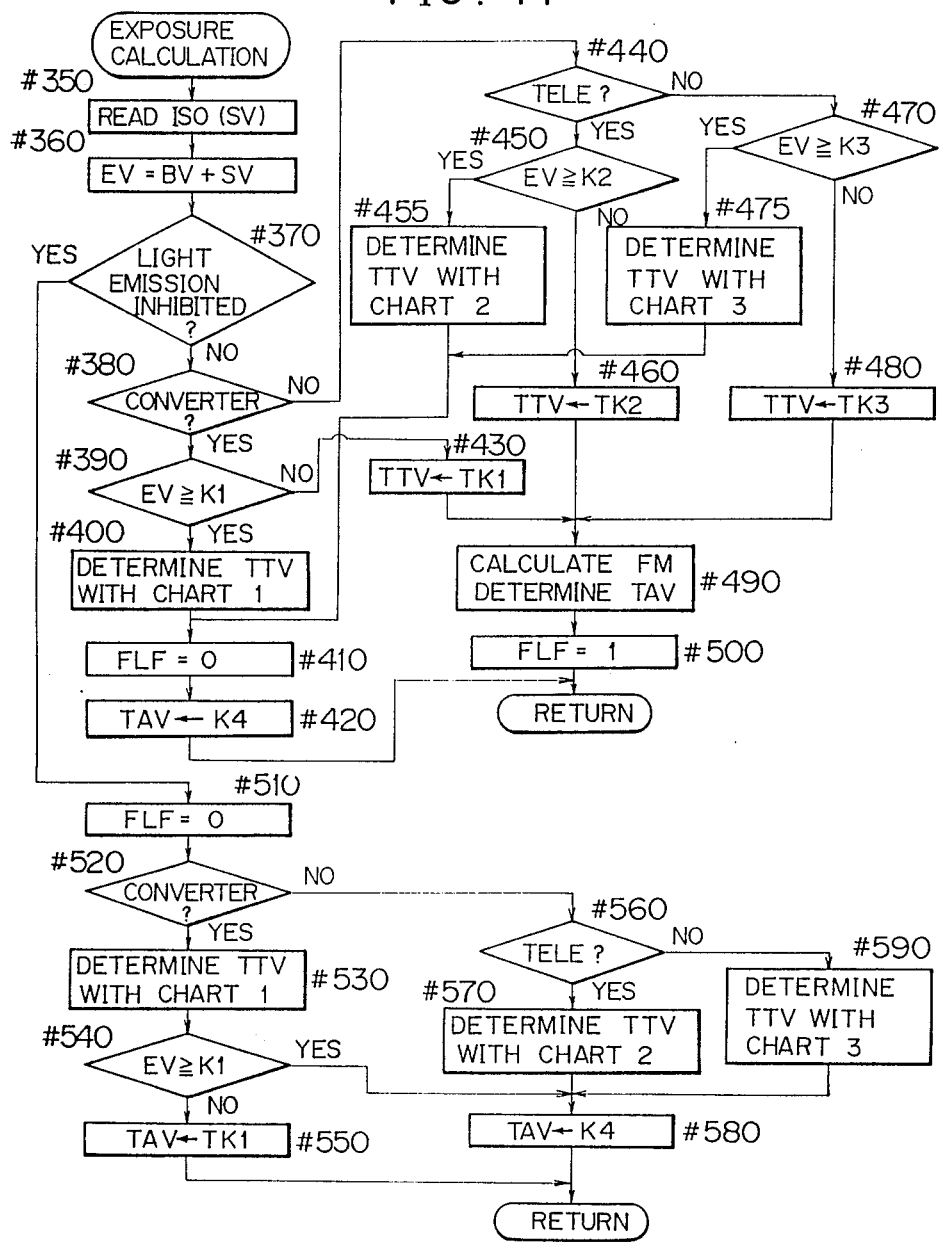

At step #160, an exposure calculation is executed in accordance with a flow chart shown in FIG. 14.

Referring to FIG. 14, at first at step #350, the CPU 3 reads a film sensitivity data SV as an APEX value from the automatic film sensitivity reading circuit 26, and then at step #360, an exposure value EV is calculated in accordance with an equation EV=SV+BV. Subsequently at step #370, it is judged whether or not the light emission inhibiting switch S3 is operated to inhibit emission of light from the flash device, and in case the switch S3 is operated ((IP9="L"), the sequence advances to step #510. To the contrary, if the switch S3 is not operated (IP9="H"), then the sequence advances to step #380.

At step #380, it is judged whether or not the tele-converter is in its operative position, and then if the tele-converter is in its operative position (IP8="L"), it is judged at step #390 where or not the exposure value EV calculated at step #360 is equal to or greater than a predetermined value K1. Then, in case the exposure value EV is equal to or greater than the predetermined value K1, the sequence advances to step #400 at which a shutter opening time TTV is determined in accordance with the exposure value EV and a program chart ① shown in FIG. 15.

Figure 15:
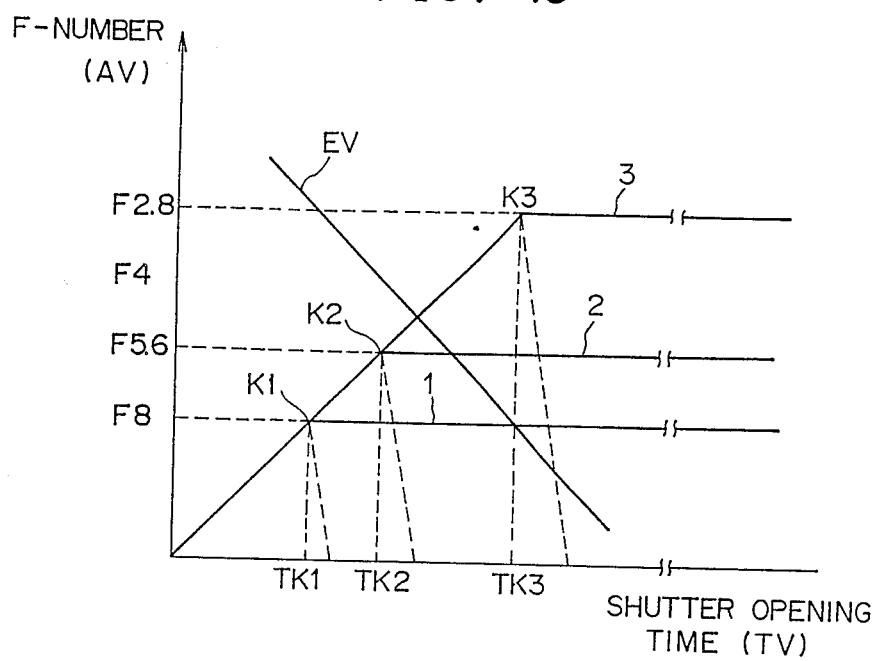
FIG. 15 is a diagram illustrating exposure operation of the camera.

Referring to FIG. 15, the axis of ordinate represents an aperture value in the form of F-number while the axis of abscissa represents an opening time of the lens shutter. Since the lens shutter now in use is of the type which serves also as an aperture diaphragm, if a shutter speed (shutter opening time) is determined, then the aperture is determined decisively.

A program chart ③ in FIG. 15 is provided for a wide condition of the photographing lens system 19, and from the program chart ③ it can be seen that the F-number in the fully open condition of the photographing lens system 19 is F2.8. Another program chart ② is provided for a tele condition, and the F-number in the fully open condition of the photographing lens system 19 is F5.6 due to advancement of the photographing lens system 19. A further program chart ① is provided for use of the tele-converter. When the tele-converter is used, the F-number in the fully open condition remains F5.6, but since the depth of field corresponding to the F-number F5.6 may not assure appropriate focusing for a certain distance zone according to the zone focusing method, the maximum aperture opening is limited to F8 in order to increase the depth of field.

The aforementioned predetermined value K1 indicates an exposure value at a cross point between the program chart ① and a horizontal line at F8. If a shutter opening time greater than a shutter opening time TK1 corresponding to the value K1 is used, then the probability increases that the camera may be moved by hand. Accordingly, in the case of an exposure value with which the shutter opening time of the camera is greater than the shutter opening time TK1, the flash device is controlled to automatically emit flash light.

This similarly applies to different predetermined values K2 and K3 which will appear hereinafter. Here, the values K1, K2 and K3 have a relationship of K1<K2<K3. Since the movement of the camera occurs more readily as the focal length increases, the period of time until the fully open condition of the shutter is reached decreases as the focal length increases in this manner.

Referring back to FIG. 14, after such determination of the shutter opening time TTV at step #400, the sequence advances to step #410 at which a flag FLF is reset to zero because no emission of flash light is required. The flag FLF indicates, when it assumes a value equal to "1", that flash light should be emitted.

Then at step #420, a high value K4 which cannot be assumed in any control of the camera is substituted into a shutter opening time TAV for determining an aperture, and then the sequence returns to the step from which the subroutine in FIG. 14 was entered.

To the contrary, in case it is judged at step #390 that the exposure value EV is smaller than the predetermined value K1, the sequence advances to step #430 at which the value TK1 is substituted into the shutter opening time TTV, whereafter the sequence advances to step #490.

At step #490, the CPU 3 executes a calculation using the distance to the object found out at step #110 of FIG. 11 and a guide number of the flash device stored in the CPU 3 and determines a shutter opening time TAV corresponding to an aperture value of results of such calculation.

Then at step #500, the aforementioned flag FLF is set to 1 indicating that emission of flash light should be performed. After then, the sequence returns to the original step.

On the other hand, in case it is judged at step #380 that the tele-converter is not in its operative position (IP8="H"), the sequence advances to step #440 at which it is judged whether or not the photographing lens system 19 is in its tele condition. Then, if the photographing lens system 19 is in its tele condition (IP4="L"), the sequence advances to step #450 at which it is judged whether or not the exposure value EV is equal to or greater than the predetermined value K2. In case the exposure value #450 is equal to or greater than the predetermined value K2, the sequence advances to step #455 at which a shutter opening time TTV is determined in accordance with the program chart ② shown in FIG. 15, whereafter the sequence advances to step #410.

To the contrary, in case it is judged at step #450 that the exposure value EV is smaller than the predetermined value K2, a predetermined value TK2 indicated in FIG. 15 is substituted, at step #460, into the shutter opening time TTV, whereafter the sequence advances to step #490.

Meanwhile, in case it is judged at step #440 that the photographing lens system 19 is not in its tele condition (IP4="H"), it is determined that the photographing lens system 19 is in its wide condition, and the sequence advances to step #470 at which it is judged whether or not the exposure value EV is equal to or greater than the predetermined value K3. In case the exposure value EV is equal to or greater than the predetermined value K3, the sequence advances to step #475 at which a shutter opening time TTV is determined in accordance with the program chart ③ shown in FIG. 15, whereafter the sequence advances to step #410.

To the contrary, in case it is judged at step #470 that the exposure value EV is smaller than the predetermined value K3, the sequence advances to step #480 at which the predetermined value K3 is substituted into the shutter opening time TTV, whereafter the sequence advances to step #490.

If it is judged at step #370 that emission of flash light should be inhibited (IP9="L"), the sequence advances to step #510 depending upon the judgment as described hereinabove. At step #510, the flag FLF is reset to zero. Then at step #520, it is judged whether or not the tele-converter is in its operative position, and when the tele-converter is in its operative position (IP8="L"), the sequence advances to step #530 at which a shutter opening time TTV is determined in accordance with the program chart ① shown in FIG. 15. Then at step

540, it is judged whether or not the exposure value EV then is equal to or greater than the predetermined value K1, and in case the exposure value EV is smaller than the predetermined value K1, the sequence advances to step #550 at which the predetermined value TK1 is substituted into the shutter opening time TAV for determining a shutter aperture, whereafter the sequence returns to the original step.

To the contrary, if it is judged at step #540 that the exposure value EV is equal to or greater than the predetermined value K1, the sequence advances to step #580 at which the value K4 which cannot be assumed in the control is substituted into the shutter opening time TAV, whereafter the sequence returns to the original step.

On the other hand, in case it is judged at step #520 that the tele-converter is not in its operative position, the sequence advances to step #560 at which it is judged whether or not the photographing lens system 19 is in its tele condition. In case the tele condition is judged (IP4="L"), the sequence advances to step #570 at which a shutter opening time TTV is determined in accordance with the program chart ② shown in FIG. 15, whereafter the sequence advances to step #580.

On the contrary, if it is judged at step #560 that the photographing lens system 19 is not in its tele condition but in its wide condition (IP4="H"), the sequence advances to step #590 at which a shutter opening time TTV is determined in accordance with the program chart ③ shown in FIG. 15, whereafter the sequence returns to step #580.

Referring back to FIG. 11, after execution of such exposure calculation control at step #160 as described above, the sequence advances to step #170 at which it is judged whether or not the photographing switch S2 is in an on-state. In case the switch S2 is in an on-state (IP6="L"), the sequence advances to step #180 at which the photographing lens system 19 is driven to move for focusing in accordance with results of the exposure calculation at step #160. Then at step #190, exposure controlling operation is executed, and after then, the CPU 3 enters a rest state.

Figure 16:
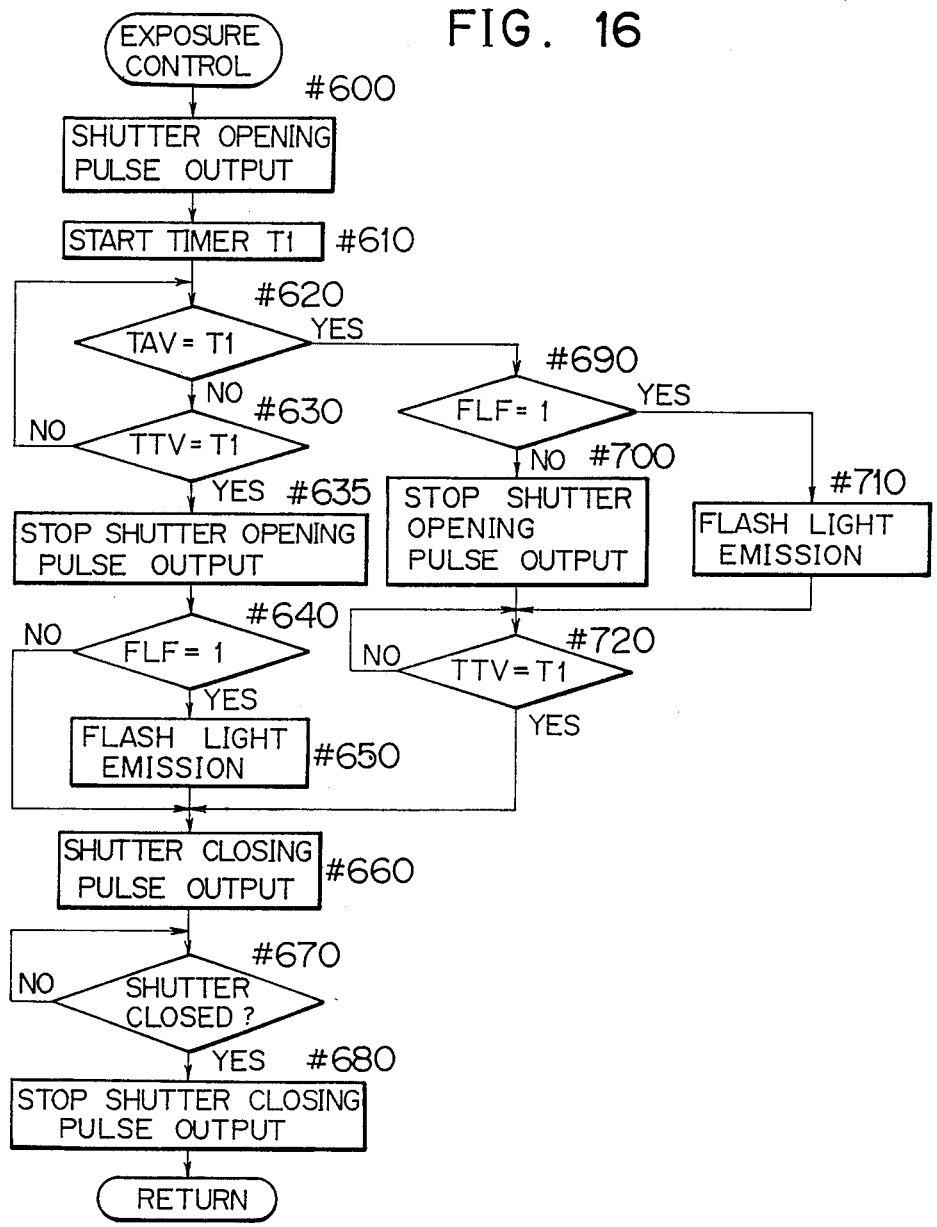

The exposure controlling operation at step #190 is illustrated more in detail in FIG. 16. Referring to FIG. 16, at first at step #600, the CPU 3 delivers pulses of a low frequency having a phase for opening the shutter to the motor M1 by way of the exposure controlling circuit 24. Consequently, the shutter is opened gradually as the number of pulses received by the motor M1 increases.

Then at step #610, a shutter opening time controlling timer T1 is started, and then at step #620, it is judged whether or not the count of the timer T1 is equal to the shutter opening time TAV for aperture set in advance as described hereinabove. In case the timer T1 is not yet equal to the shutter opening time TAV, the sequence advances to step #630 at which it is judged whether or not the count of the timer T1 reaches the shutter opening time TTV for shutter speed. In case the shutter opening time TTV is not yet reached, the sequence returns to step #620.

If the timer T1 counts to the shutter opening time TTV, the sequence advances from step #630 to step #635 at which delivery to the motor M1 of pulses for opening the shutter is stopped. Then at step #640, the flag FLF is checked to determine whether or not flash light should be emitted. In case flash photographing should not be performed (FLF=0), the sequence directly advances to step #660. To the contrary, in case flash photographing should be performed (FLF=1), the CPU 3 delivers, at step #650, a flash light emitting instruction signal from the port X thereof to the flash device 23. Consequently, flash light is emitted from the flash device 23. After then, the sequence advances to step #660.

At step #660, the CPU 3 delivers pulses of a high frequency for closing the shutter to the motor M1 by way of the exposure controlling circuit 24. Consequently, the shutter is closed rapidly in accordance with the number of pulses received by the motor M1.

Subsequently at step #670, the CPU 3 waits until the shutter is closed completely so that the switch SSC is turned on (IP1="L"), whereafter the sequence advances to step #680 at which the delivery of pulses to the motor M1 is stopped. After then, the sequence returns to the original step.

If it is judged at step #620 that the count of the counter T1 reaches the shutter opening time TAV for aperture, the sequence advances to step #690 at which the flag FLF is checked to determine whether or not flash light should be emitted for photographing. In case flash light should not be emitted (FLF=0), the sequence advances to step #700 at which the delivery of pulses for opening the shutter is stopped to stop the motor M1. Consequently, the aperture value is held at a value corresponding to the value TAV set in advance as described above. After then, the sequence advances to step #720.

To the contrary, in case it is judged at step #690 that flash light should be emitted, the sequence advances to step #710 at which the CPU 3 delivers a flash light emitting instruction signal from the port X thereof to the flash device 23. Consequently, flash light is emitted from the flash device 23. After then, the sequence advances to step #720.

At step #720, the CPU 3 waits until the shutter opening time T1 becomes equal to the shutter opening time TTV. After then, the sequence advances to step #660 in order to subsequently close the shutter.

Referring back to FIG. 11, in case it is judged at step #170 that the photographing switch S2 is not in an on-state (IP6="L"), the sequence advances to step #200 at which it is judged whether or not the photographing preparing switch S1 is in an off-state (IP5="H"). If the photographing preparing switch S1 is in an off-state, the sequence advances to step #100, but on the contrary if the switch S1 is not in an off-state, the sequence advances to step #170.

With the camera system described hereinabove, directly after the tele-converter is shifted to its operative position or to its inoperative position, the CPU 3 is rendered operative by an interrupt, and in case the tele-converter is in its operative position and the main switch SM is in an on-state, the photographing lens system 19 is automatically changed over to the tele condition, but on the contrary in case the tele-converter is not in its operative position and the main switch SM is in an off-state, the photographing lens system 19 is automatically changed over to the wide condition. Meanwhile, when the tele-converter is in its operative position, the photographing lens system 19 is automatically changed over independently of a current state of the main switch SM. However, if the camera is rendered operative only by shifting movement of the tele-converter between its operative and inoperative positions, it may possibly be mistaken that the camera fails.

This is because it is commonly regarded that a camera will not operate when a main switch of the camera is in an off-state.

Figure 17:
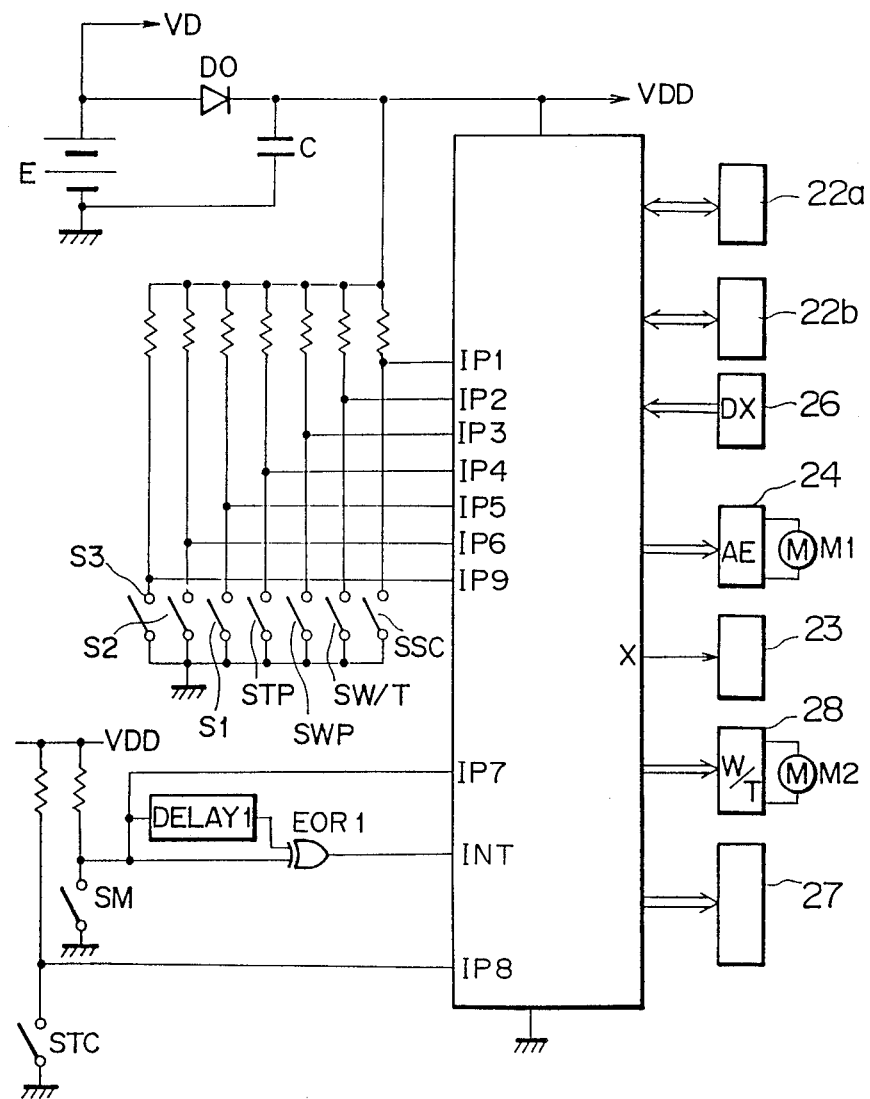
FIG. 17 is a block diagram of a modified electric circuit to the electric circuit shown in FIG. 7.

Referring now to FIG. 17, there is shown a circuit diagram of an electric circuit of a camera system wherein the camera is not rendered operative by an interrupt even if a converter is changed over between its operative and inoperative positions. The circuit shown in FIG. 17 is a modification to the circuit shown in FIG. 10, and like components or portions are denoted by like reference characters and overlapping description thereof will be omitted herein. This also applies to any modification described hereinafter.

The circuit shown in FIG. 17 is only different from the circuit shown in FIG. 10 in that circuit elements of the circuit shown in FIG. 10 which relate to produce an interrupt signal to be received at the interrupt input port INT of the CPU 3 when the converter is used, that is, the delay circuit Delay 2, exclusive OR circuit EOR2 and OR circuit OR1, are omitted in the modified circuit shown in FIG. 17.

Figure 18:
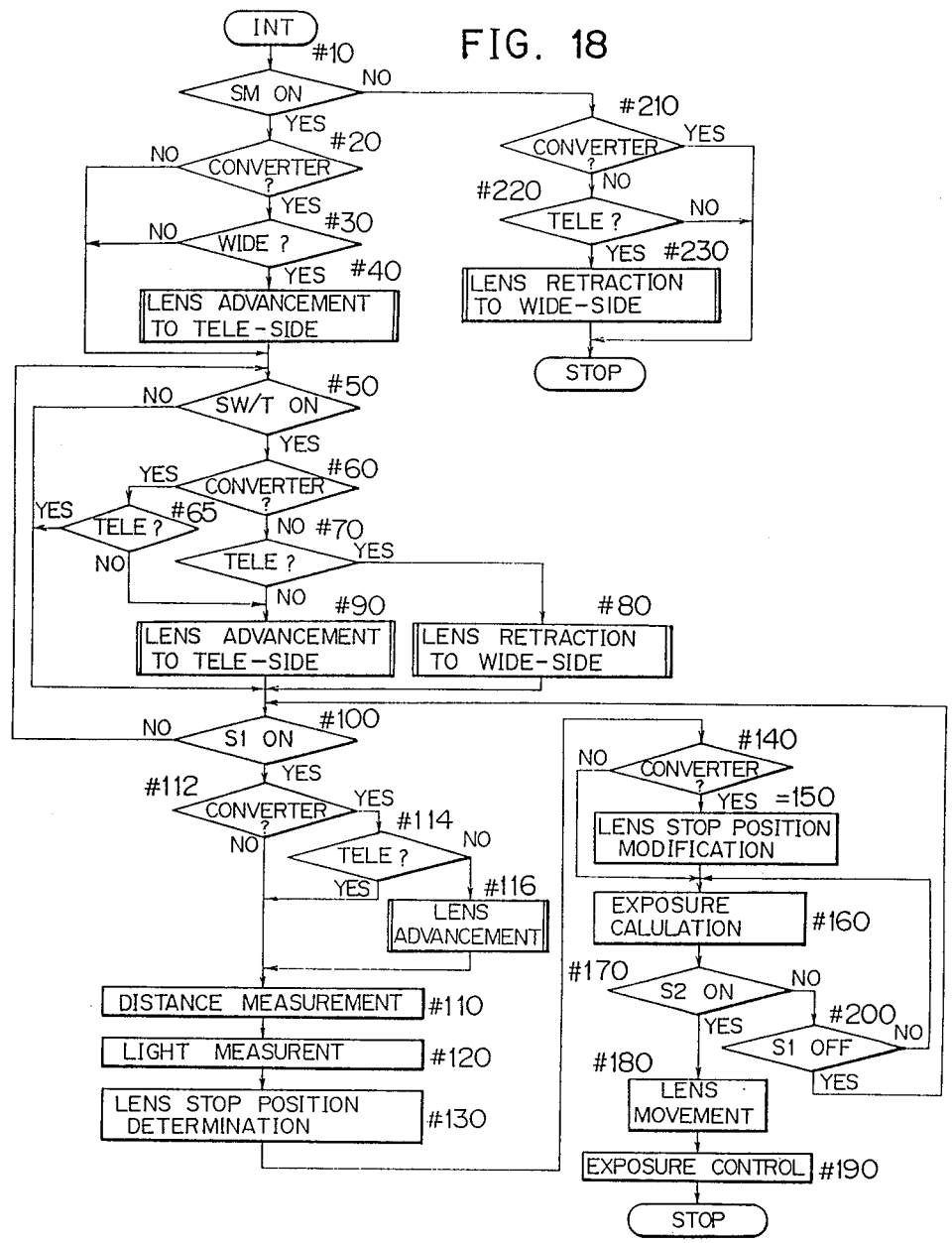
FIG. 18 is a flow chart illustration operation of a camera having the electric circuit shown in FIG. 17.

The modified circuit thus operates in a similar manner as the circuit shown in FIG. 10, and a flow chart representing such operation is shown in FIG. 18. The flow chart of FIG. 18 is also a modification to the flow chart of FIG. 11, and only differences will be described below.

Referring to FIG. 18, a step #65 is added after step #60. In particular, in case it is judged at step #60 that the converter is in its operative position (IP8="L"), the sequence advances to step #65 at which it is judged whether or not the photographing lens system 19 is in the tele condition. In case the photographing lens system 19 is not in the tele condition (IP4="H"), the sequence advances to step #90 at which the photographing lens system 19 is advanced to the tele condition. Thus, while in the circuit shown in FIG. 10 the CPU 3 is rendered operative upon movement of the converter to its operative position and the photographing lens system 19 is advanced to the tele condition without fail, in the case of the modified circuit shown in FIG. 17, when the focal length changing over switch SW/T is operated, it is judged whether or not the converter is in its operative position, and only if the converter is in its operative position and the photographing lens system 19 is in its wide condition, a changing over operation is performed to advance the photographing lens system 19 to its tele condition.

Further, steps #112, #114 and #116 are interposed between the steps #100 and #110. In particular, in case it is judged at step #100 that the photographing preparing switch S1 is in an on state (IP5="L"), the sequence advances to step #112 at which it is judged whether or not the converter is in its operative position. In case the converter is not in its operative position, the sequence advances directly to step #110, but on the contrary in case the converter is in its operative position, the sequence advances to step #114.

At step #114, it is judged whether the photographing lens system 19 is in its tele condition, and if the photographing lens system 19 is in its tele condition (IP4="L"), the sequence advances to step #110, but on the contrary if the photographing lens system 19 is not in its tele condition but in its wide condition (IP4="L"), the sequence advances to step #116. At step #116, the photographing lens system 19 is automatically advanced to the tele condition, whereafter the sequence advances to step #110.

This is intended to prevent, when the converter is shifted to its operative position after turning on of the main switch SM, a possible failure that the tele-converter which is designed for tele-photographing may be used to take a photograph while the photographing lens system 19 remains in its wide condition.

Figure 19:
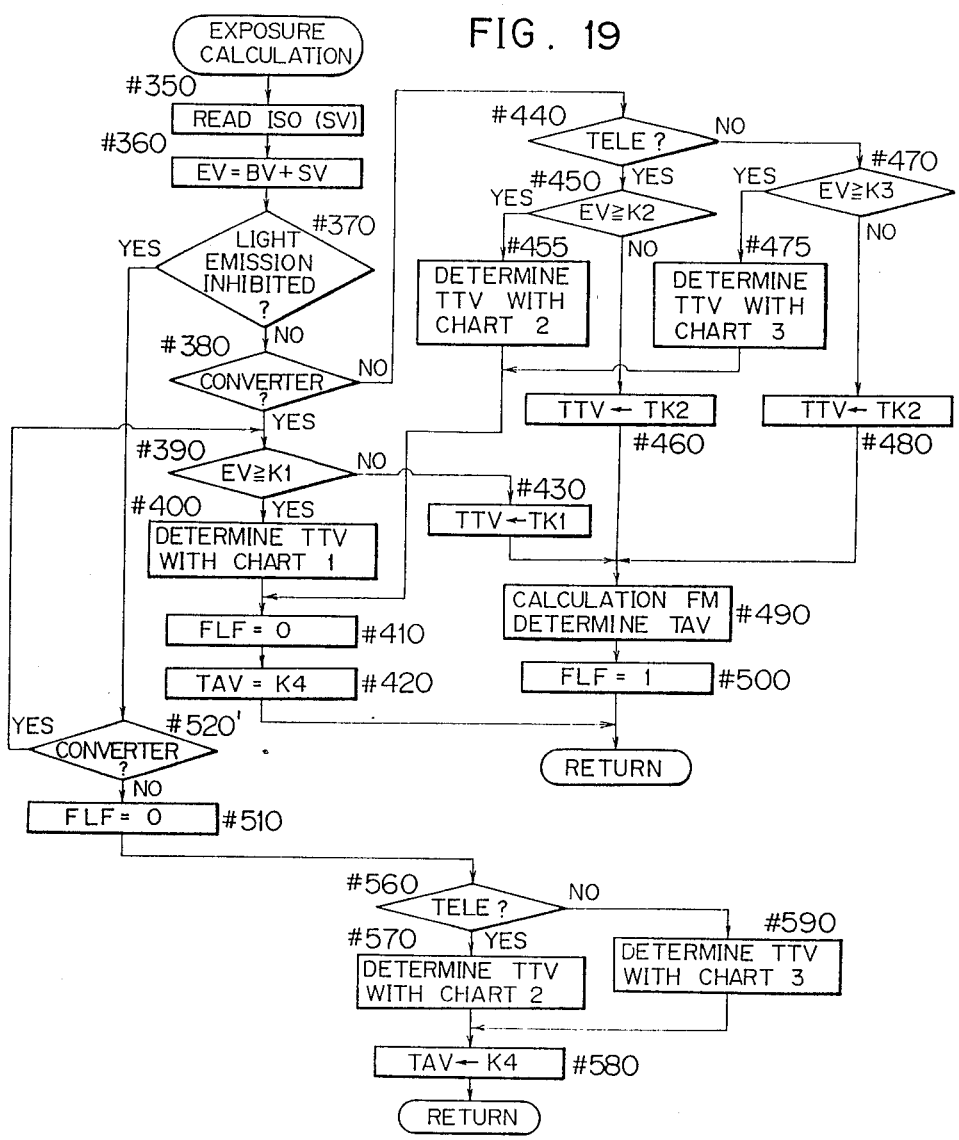
FIG. 19 is a flow chart illustrating modified operation of the camera of FIG. 1 having the electric circuit shown FIG. 7.

A modified flow chart to the flow chart shown in FIG. 14 is shown in FIG. 19. In the camera system which is controlled in accordance with the flow charts shown in FIGS. 11 to 14 and 16, where the tele-converter is used, the aperture value is limited to F8 as described hereinabove. Generally in the case of a focusing system of the zone focusing type, when an object to be photographed is at a particular distance, an in-focus condition may not be obtained. A camera is normally designed such that this is covered by the depth of field even with an fully open aperture. However, where the auxiliary lens system of a tele-converter is inserted in front of the focusing optical system (i.e., where a tele-converter is in its operative position), a possible out-of-focus condition may not be covered by the depth of field at a fully open aperture.

Further, generally in the case of a shutter which serves also as an aperture diaphragm, since the aperture is opened gradually toward the fully open aperture, an influence of the depth of field corresponding to the fully open aperture is not exhibited unless exposure operation is continued with the aperture fully opened for some interval of time after the fully open aperture is reached.

Taking notice of the fact, the exposure calculation subroutine shown in FIG. 19 is modified such that exposure operation for a long interval of time with the aperture fully opened is inhibited in order to eliminate a drawback that an in-focus condition may not be reached at a particular distance to an object to be photographed. More particularly, when a tele-converter is mounted in its operative position, the light emission inhibiting mode is inhibited so that exposure operation may be performed with a greater depth of field than the depth of field corresponding to the fully open aperture. Differences of the modified exposure calculation subroutine from the subroutine shown in FIG. 14 will be described below with reference to FIG. 19.

In particular, a step #520' is provided in place of the step #520 of FIG. 14 but is interposed at a different location, that is, between steps #370 and #510. In case it is judged at step #370 that the flash light emission inhibiting switch S3 is in an on-state (IP9="L"), the sequence advances to step #520' at which it is judged whether or not the converter is in its operative position. Then, if the converter is not in its operative position (IP8="H"), the sequence advances to step #510, but on the contrary if the converter is in its operative position (IP8="L"), then the sequence advances forcibly to step #390. Thus, even if the flash light emission inhibiting switch S3 is in an on-state, if the converter is in its operative position, the sequence advances forcibly to step #390. It is to be noted that since the sequence advances to step #390 in case judgment at step #520' is in the affirmative, the steps #520 to #550 of FIG. 14 which are required only when judgment at step #520 is in the affirmative are omitted in the flow chart shown in FIG. 14.

In the present modification, when the tele-converter is mounted in its operated position, if an object to be photographed is darker than a predetermined level, the flash light emission inhibiting mode is inhibited to forcibly enter an automatic light emitting mode as described above. However, it is different from the intention of a photographer that, while the flash light emission inhibiting switch is operated, the flash device emits light depending upon a brightness of an object to be photographed. In the modification, in the case of a brightness with which appropriate exposure cannot be attained unless exposure operation is continued at the exposure value of F8 (EV<K1), the exposure value is limited to F8 (EV=K1). In this instance, exposure will be insufficient.

Figure 20:
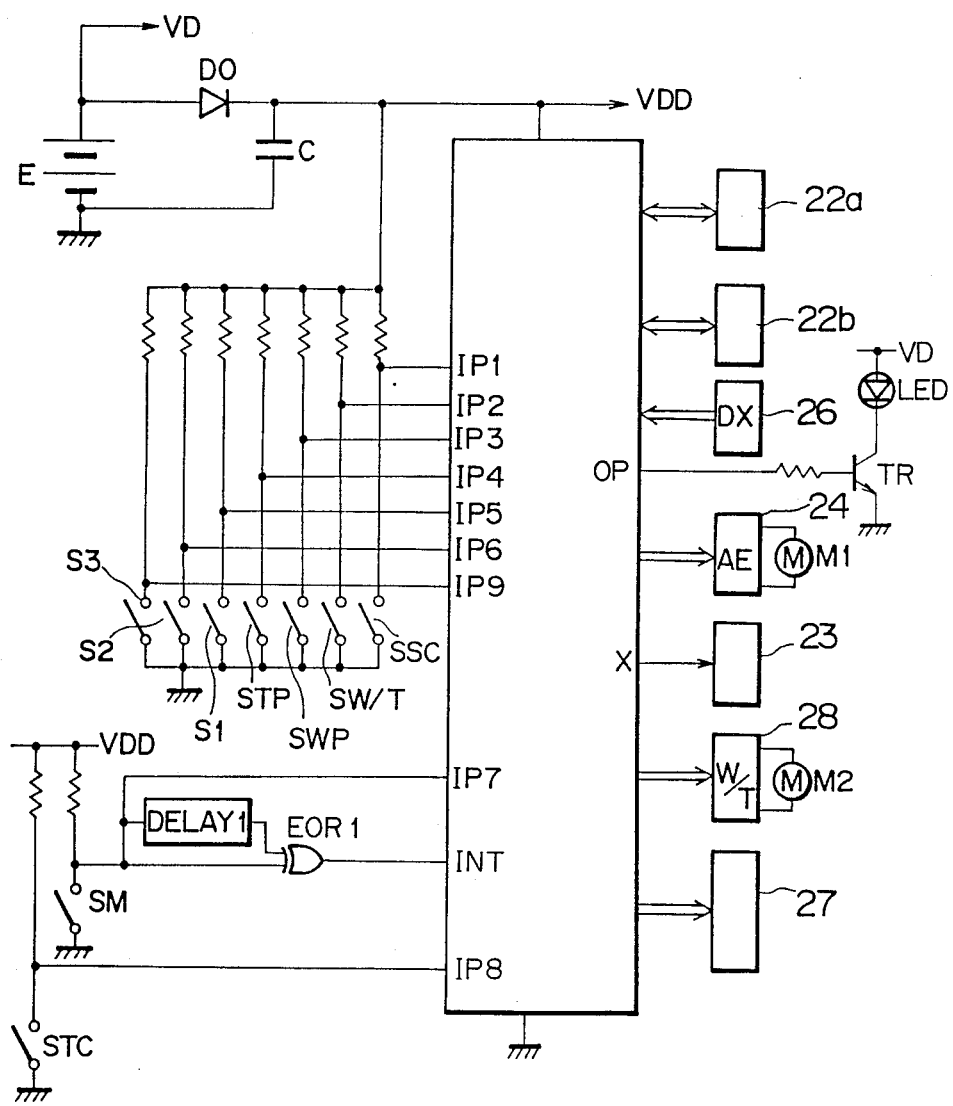
FIG. 20 is a block diagram of another modified electric circuit to the electric circuit shown in FIG. 7.

FIG. 20 shows another modified electric circuit by means of which, when insufficient exposure occurs in such a manner as described just above, a warning is given to a photographer so that the photographer may not photograph in the light emission inhibiting mode.

Referring to FIG. 20, the circuit shown is a modification to the circuit shown in FIG. 17 and is only different from the circuit shown in FIG. 17 in that it includes a light emitting diode LED provided in a viewfinder of the camera and a transistor Tr for driving the light emitting diode LED while the CPU 3 has an additional output port OP connected to the base of the transistor Tr by way of a resistor, and that, though not particularly shown, the automatic film sensitivity reading circuit 26 reads information of a latitude on the under side.

Figure 21:
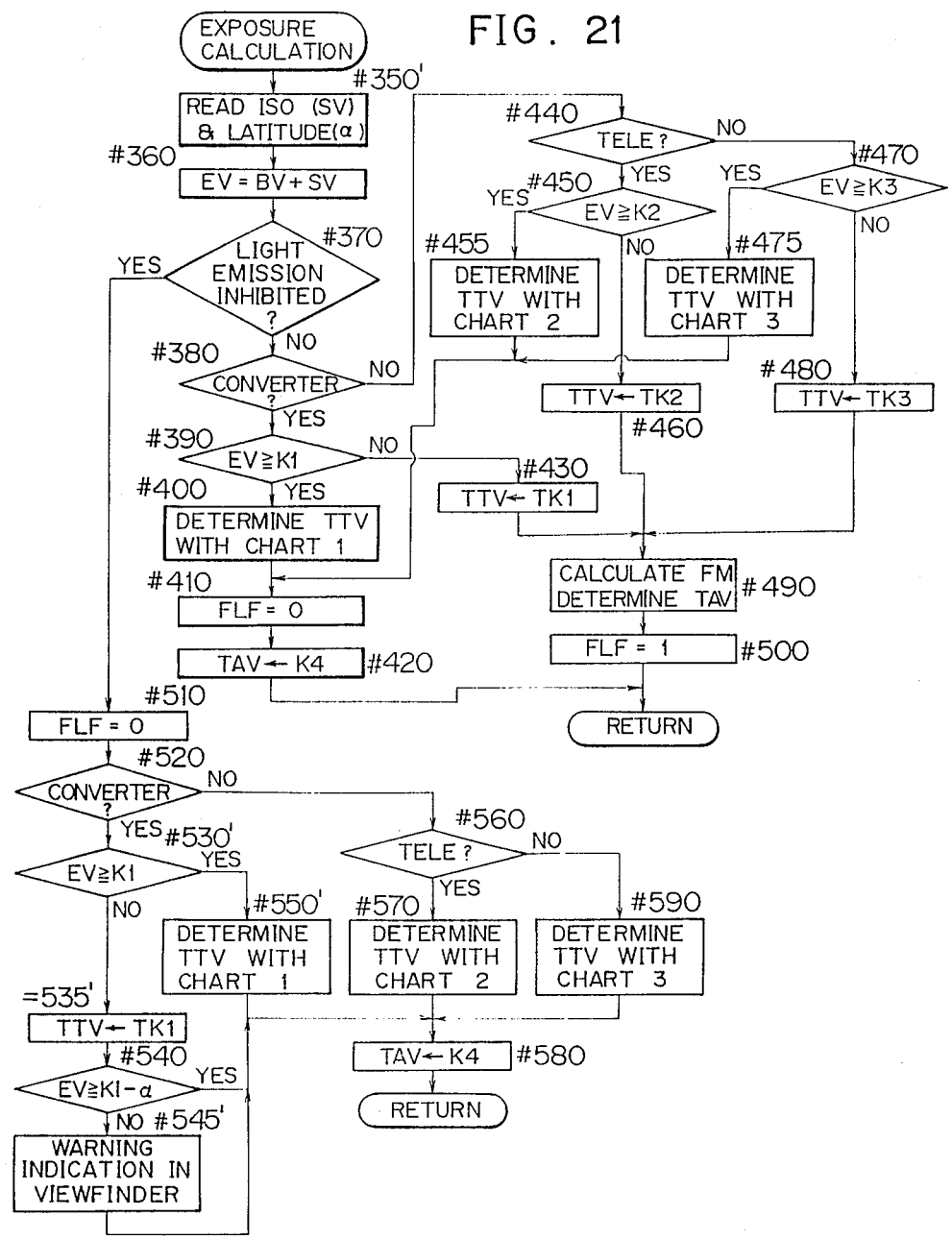
FIG. 21 is a flow chart illustrating operation of a camera having the electric circuit shown in FIG. 20.

FIG. 21 illustrates operation of the modified circuit shown in FIG. 20. Referring to FIG. 21, the flow chart shown is a modification to the flow chart shown in FIG. 14 and is only different in that the step 350 of the flow chart shown in FIG. 14 is replaced by a step #350' and the steps #530, #540 and #550 are also replaced by steps #530', #535', #540', #545' and #550'. In particular, at step #350', the CPU 3 reads a latitude α on the under side together with a film sensitivity SV from the automatic film sensitivity reading circuit 26.

On the other hand, in case it is judged at step #520 that the converter is in its operative position (IP8="H"), the sequence advances to step #530' at which it is judged whether or not the exposure value EV obtained at step #360 is equal to or greater than K1. In case the exposure value EV is smaller than K1, the predetermined value TK1 is substituted into the shutter opening time TTV at step #535', and then it is judged at subsequent step #540' whether or not the exposure value EV is equal to or greater than K1−α. In the case of EV>K1−α, it is determined that the exposure value EV is not within the range of the latitude, and the sequence advances to step #545' at which the light emitting diode LED in the viewfinder is lit to give a warning indication to a photographer. In particular, the CPU 3 changes the voltage at the output port OP thereof to the high level which is amplified by the transistor TR to energize the light emitting diode LED. After then, the sequence advances to step #580.

To the contrary, in case it is judged at step #530' that the exposure value EV is equal to or greater than the predetermined value K1, the sequence advances to step #550' at which a shutter opening time TTV is determined in accordance with the program chart ① shown in FIG. 15. After then, the sequence advances to step #580. Also when it is judged at step #540' that the exposure value EV is equal to or greater than K1−α, the sequence advances to step #580.

Thus, when insufficient exposure occurs during use of the tele-converter, a warning indication is given to a photographer so that photographing with the fully open aperture for a long period of time may not be performed as far as possible. Besides, if the flash light emission inhibiting switch is turned on, then no flash light is emitted. Accordingly, the intention of a photographer is reflected to some degree.

Further, while the possibility that the shutter may remain in the fully open aperture condition is eliminated by the comparison between the exposure value EV and the value K1−α at step #530', if the fully open aperture condition of the shutter continues only for a short period of time, it has only a small influence on the depth of field.

Thus, the exposure value EV may be compared not with K1 but a value of α subtracted from another value a little smaller than K1.

In all of the embodiment and modifications described above, when the tele-converter is in its operative position, photographing is performed with the photographing lens system in the tele condition. However, even if a field to be photographed is eclipsed or an aberration occurs, a photographer may photograph in the wide condition using the tele-converter in order to assure a photographing magnification. To this end, for example, the steps #60 and #65 of the flow chart shown in FIG. 18 should be omitted.

Further, the tele-converter may be replaced by a wide converter.

Having now fully described the invention, it will be apparent to one of ordinary skill in the art that many changes and modifications can be made thereto without departing from the spirit and scope of the invention as set forth herein.

What is claimed is:

1. Camera system including a camera body and a converter lens attachable to said camera body, comprising:
    first means provided in said camera body for producing either of a first signal and a second signal so as to produce the first signal in response to the attachment of said converter lens to said camera body;
    second means provided in said converter lens for producing either of a third signal and a fourth signal so as to produce the third signal when said converter lens is put into its usable state;
    means provided in said camera body for detecting the attachment of said converter lens to said camera body when said first producing means produces the first signal and said second producing means produces the third signal; and
    means provided in said camera body for controlling an operation of said camera system so that an operation of said camera system when the attachment of said converter lens is detected by said detecting means is different from that when the attachment of said converter lens is not detected by said detecting means.

2. Camera system as claimed in claim 1, wherein said converter lens is attachable to said camera body so that a focal length of a compound lens system including said converter lens and a main lens system of said camera body is longer than a focal length of said main lens system alone.

3. Camera system as claimed in claim 2, wherein said first producing means includes a first electric switch provided in said camera body and said second producing means includes a second electric switch which is connected in series to said first electric switch when said converter lens is attached to said camera body.

4. Camera system including a camera body and a converter lens attachable to said camera body, comprising:
- a first switch member provided in the camera body, said first switch member being brought into a first state in response to the attachment of said converter lens to said camera body, said first switch member being brought into a second state state in response to removal of said converter lens from said camera body;
- a second switch member provided in said converter lens and connected serially to said first switch member provided in said camera body when said converter lens is attached to said camera body, said second switch member being brought into a first state when said converter lens is brought into its usable state but into a second state when said converter lens is brought out of the usable state;
- means provided in said camera body and connected serially to said first switch member for detecting the attachment of said converter lens to said camera body when both of said first and second switch members are brought into their respective first states; and
- means provided in said camera body for controlling an operation of said camera system such that an operation of said camera system when the attachment of said converter lens is detected by said detecting means is different from that when the attachment of said converter lens is not detected by said detecting means.

5. Camera system as claimed in claim 4, further comprising means provided in said converter lens for manually operating said second switch member.

6. Converter lens attachable to a camera body, comprising:
- means for producing either of a first signal and a second signal so as to produce the first signal when said converter lens is brought into its usable state; and
- means for transmitting either of the first and second signals produced by said producing means to said camera body to which said converter lens is attached.

7. Converter lens as claimed in claim 6, further comprising means for manually operating said producing means to manually select either of the first and second signals.

8. Converter lens as claimed in claim 7, wherein said manually operating means includes a hinge portion whose angle is controllable manually, and means for controlling said producing means in accordance with the angle of said hinge portion.

9. Converter lens attachable to a camera body, comprising:
- a switch member which is brought into a first state when said converter lens is brought into its usable state but into a second state when said converter lens is brought out of the usable state; and
- means for transmitting the state of said switch member to said camera body to which said converter lens is attached.

10. Camera system including a camera body having a main lens system, and a tele-converter attachable to said camera body for changing a focal length of a compound lens system including said main lens system and said tele-converter with respect to a focal length of said main lens system alone, said camera system comprising:
- means for detecting the attachment of said tele-converter to said camera body;
- means including a manually operable member for changing the focal length of said main lens system in accordance with the operation of said manually operable member; and
- means for controlling said changing means so that the focal length of said main lens system is forcibly set to a predetermined length and thereafter a change in the focal length of said main lens system is inhibited when said detecting means detects the attachment of said tele-converter.

11. Camera system as claimed in claim 10, wherein said main lens system includes an optical unit movable along the optical axis of said main lens system for changing the focal length thereof, and said changing means includes means for shifting said optical unit along the optical axis in accordance with the operation of said manually operable member.

12. Camera system as claimed in claim 10, wherein said controlling means includes means for setting the focal length of said main lens system to its longer focal length.

13. Camera system including a camera body having a main lens system, and a converter lens attachable to said camera body for changing a focal length of a compound lens system including said main lens system and said converter lens with respect to a focal length of said main lens system alone, said camera system comprising:
- means for detecting the attachment of said converter lens system to said camera body;
- a first manually operable member;
- means for changing the focal length of said main lens system in accordance with the operation of said first manually operable member;
- a second manually operable member;
- means for measuring a brightness of an object to be photographed in response to the operation of said second manually operable member; and
- means for controlling said changing means to forcibly set the focal length of said main lens system to a predetermined length in response to the operation of said second manually operable member when said detecting means detects the attachment of said converter lens.

14. Camera system as claimed in claim 13, wherein said main lens system includes an optical unit movable along the optical axis of said main lens system for changing the focal length thereof, and said changing means includes means for shifting said optical unit along the optical axis in accordance with the operation of said first manually operable member.

15. Camera system as claimed in claim 13, wherein said converter lens is a tele-converter attachable to said camera body for extending the focal length of said compound lens system in comparison with the focal length of said main lens system alone, and said controlling means includes means for setting the focal length of said main lens system to its longest focal length.

16. Camera system including a camera body having a main lens system, and a converter lens attachable to said camera body for changing a focal length of a compound lens system including said main lens system and said converter lens with respect to a focal length of said main lens system alone, said camera system comprising:
- means for detecting the attachment of said converter lens to said camera body;
- a first manually operable member;

means for changing the focal length of said main lens system in accordance with the operation of said first manually operable member;

a second manually operable member;

means for selecting either of a first state and a second state in accordance with the operation of said second manually operable member;

a third manually operable member;

means for measuring a brightness of an object to be photographed in response to the operation of said third manually operable member when said selecting means selects the first state in accordance with the operation of said second manually operable member; and means for controlling said changing means to forcibly set to the focal length of said main lens system to a predetermined length in response to a selection of the first state from the second state by said selecting means in accordance with the operation of said second manually operable member when said detecting means detects the attachment of said converter lens.

17. Camera system as claimed in claim 16, wherein said main lens system includes an optical unit movable along the optical axis of said main lens system for changing the focal length thereof, and said changing means includes means for shifting said optical unit along the optical axis in accordance with the operation of said first manually operable member.

18. Camera system as claimed in claim 16, wherein said converter lens is a tele-converter attachable to said camera body for extending the focal length of said compound lens system with respect to the focal length of said main lens system alone, and said controlling means includes means for setting the focal length of said main lens system to its longest focal length.

19. Camera system including a camera body having a main lens system, and a tele-converter attachable to said camera body for extending a focal length of a compound lens system including said main lens system and said converter lens with respect to a focal length of said main lens system alone, said camera system comprising:

means for detecting the attachment of said tele-converter to said camera body;

a first manually operable member;

means for changing the focal length of said main lens system in accordance with the operation of said first manually operable member; and means for controlling said changing means to permit the changing in the focal length of said main lens system to the longer focal length side by said changing means while preventing the change in the focal length of said main lens system to the shorter focal length side by said changing means when the attachment of said tele-converter is detected by said detecting means.

20. Camera system as claimed in claim 19, wherein said main lens system includes an optical unit movable along the optical axis of said main lens system for changing the focal length thereof, and said changing means includes means for shifting said optical unit along the optical axis in accordance with the operation of said first manually operable member.

21. Camera system as claimed in claim 19, wherein said controlling means further controls said changing means to forcibly set the focal length of said main lens system to its longest focal length when the attachment of said tele-converter is detected by said detecting means and to inhibit the operation of said changing means after the focal length of said main lens system is set to its longest focal length.

22. Camera system including a camera body having a main lens system, and a converter lens attachable to said camera body for changing a focal length of a compound lens system including said main lens system and said converter lens with respect to a focal length of said main lens system alone, said camera system comprising:

means for detecting the attachment of said converter lens to said camera body;

a first manually operable member;

means for changing the focal length of said main lens system in accordance with the operation of said first manually operable member;

a second manually operable member;

means for selecting either of a first state and a second state in accordance with the operation of said second manually operable member;

a third manually operable member;

means for measuring a brightness of an object to be photographed in response to the operation of said third manually operable member when said selecting means selects the first state in accordance with the operation of said second manually operable member;

means for controlling said changing means in response to the selection of the second state from the first state by said selecting means in accordance with the operation of said second manually operable member to forcibly set said main lens system to its shortest focal length when no attachment of said converter lens is detected by said detecting means and to prevent the forcibly setting operation of said changing means when the attachment of said converter lens is detected by said detecting means.

23. Camera system as claimed in claim 22, wherein said main lens system includes an optical unit movable along the optical axis of said main lens system for changing the focal length thereof, and said changing means includes means for shifting the optical unit along the optical axis in accordance with the operation of said first manually operable member.

24. Camera system as claimed in claim 22, wherein said converter lens is a tele-converter attachable to said camera body for extending the focal length of said compound lens system with respect to the focal length of said main lens system alone.

25. Camera system including a camera body having a main lens system, and a tele-converter attachable to said camera body for changing a focal length of a compound lens system including said main lens system and said converter lens with respect to a focal length of said main lens system alone, said camera system comprising:

means for detecting the attachment of said tele-converter to said camera body;

means for measuring a brightness of an object to be photographed;

means for calculating an exposure value on the basis of the brightness measured by said brightness measuring means;

means for determining an aperture value on the basis of the exposure value calculated by said calculating means;

means for correcting the aperture value determined by said determining means when the attachment of said tele-converter is detected by said detecting means; and means for controlling an aperture of said camera system on the basis of the aperture value corrected by said correcting means when the attachment of said tele-converter is detected by said detecting means.

26. Camera system as claimed in claim 25, wherein said controlling means includes means for controlling the aperture on the basis of the aperture value determined by said determining means when no attachment of said tele-converter is detected by said detecting means.

27. Camera system including a camera body having a main lens system, and a tele-converter attachable to said camera body for changing a focal length of a compound lens system including said main lens system and said converter lens with respect to a focal length of said main lens system alone, said camera system comprising:
   means for detecting the attachment of said tele-converter to said camera body;
   means for measuring a brightness of an object to be photographed;
   means for calculating an exposure value on the basis of the brightness measured by said brightness measuring means;
   lens shutter means for gradually opening and closing an exposure aperture for exposing a film;
   first means for controlling an exposure time of said lens shutter means on the basis of the exposure value calculated by said calculating means; and
   means for limiting the exposure time controlled by said controlling means within a predetermined exposure time range shorter than a predetermined exposure time when the attachment of said tele-converter is detected by said detecting means.

28. Camera system as claimed in claim 27, further comprising means for discriminating whether or not the exposure value calculated by said calculating means is below a predetermined exposure value, means for illuminating the object with flash light, and second means for controlling both of said illuminating means and said limiting means to making both of said illuminating means and said limiting means operable when said discriminating means discriminates that the exposure value calculated by said calculating means is below the predetermined exposure value.

29. Camera system as claimed in claim 28, further comprising means for inhibiting the operation of said illuminating means, and wherein said second controlling means controls said inhibiting means to interrupt the operation of said inhibiting means for permitting the illumination of said illuminating means when said discriminating means discriminates that the exposure value calculated by said calculating means is below the predetermined exposure value.

30. Camera system including a camera body having a main lens system, and a tele-converter attachable to said camera body for changing a focal length of a compound lens system including said main lens system and said converter lens with respect to a focal length of said main lens system alone, said camera system comprising:
   means for illuminating an object to be photographed by a flash light;
   means provided in said camera body for setting a flash photography mode in which said illuminating means is operable; and
   means provided in said tele-converter for preventing a manual operation of said setting means when said tele-converter is attached to said camera body.

* * * * *

UNITED STATES PATENT AND TRADEMARK OFFICE
CERTIFICATE OF CORRECTION

PATENT NO. : 4,933,692
DATED : June 12, 1990
INVENTOR(S) : Yoshinobu Kudo, et al.

It is certified that error appears in the above-identified patent and that said Letters Patent is hereby corrected as shown below:

In col. 2, last line, after "shown" insert -- in --.
In col. 6, line 28, change "detain" to -- detail --.
In col. 9, line 35, change "of" to -- or --.
In col. 10, line 53, before "zones" insert -- the --.
In col. 11, line 13, change "where" to -- whether --.
In col. 11, lines 56 and 57, change "K1<K2<K3" to
-- K1>K2>K3 --.
In col. 17, line 46, change "EV>K1-$\alpha$ to -- EV<K1-$\alpha$ --.

Signed and Sealed this

Seventh Day of January, 1992

Attest:

HARRY F. MANBECK, JR.

*Attesting Officer*    *Commissioner of Patents and Trademarks*